United States Patent
Newman et al.

(10) Patent No.: US 12,034,571 B2
(45) Date of Patent: *Jul. 9, 2024

(54) MODULATION AND DEMODULATION FOR ENHANCED NOISE MARGINS IN 5G AND 6G

(71) Applicants: David E. Newman, Poway, CA (US); R. Kemp Massengill, Palos Verdes, CA (US)

(72) Inventors: David E. Newman, Poway, CA (US); R. Kemp Massengill, Palos Verdes, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/376,214

(22) Filed: Oct. 3, 2023

(65) Prior Publication Data
US 2024/0031205 A1    Jan. 25, 2024

Related U.S. Application Data

(63) Continuation of application No. 18/212,905, filed on Jun. 22, 2023, now Pat. No. 11,811,565, which is a continuation of application No. 17/994,876, filed on Nov. 28, 2022, now Pat. No. 11,736,320.

(60) Provisional application No. 63/426,853, filed on Nov. 21, 2022, provisional application No. 63/418,784, filed on Oct. 24, 2022, provisional application No.
(Continued)

(51) Int. Cl.
*H04L 25/03* (2006.01)

(52) U.S. Cl.
CPC ... *H04L 25/03006* (2013.01); *H04L 2025/0342* (2013.01)

(58) Field of Classification Search
CPC . H03D 3/009; H03C 3/38; H03C 3/40; H04B 10/6165; H04L 25/03006; H04L 2025/0342; H04L 27/26; H04L 27/2601; H04L 27/2647; H04L 27/2655;
(Continued)

(56) References Cited

U.S. PATENT DOCUMENTS

| | | | | |
|---|---|---|---|---|
| 4,327,439 A | * | 4/1982 | Gockler | H04L 27/2089 375/280 |
| 4,860,316 A | * | 8/1989 | Takenaka | H04L 27/3411 375/264 |

(Continued)

*Primary Examiner* — James M Perez

(57) ABSTRACT

Message faults are expected to become a major problem for next-generation 5G/6G networks, due to signal fading, high backgrounds, and high density of users. Disclosed are methods to modulate and demodulate messages to optimize noise margins, greatly enhancing reliability at negligible cost, according to some embodiments. A transmitter can modulate a message using amplitude-phase modulation, yet a receiver can conveniently receive and process the signals according to separate in-phase (I) and quad-phase (Q) branches, that is, according to QAM. The receiver can then convert the I and Q values to the original waveform amplitude and phase mathematically, and then demodulate those values using predetermined amplitude and phase levels as provided by a proximate demodulation reference. By converting the as-received QAM values to the as-transmitted amplitude-phase values, the receiver can thereby avoid many noise vulnerabilities inherent in QAM-modulated messages, and thereby obtain the full noise margins provided by amplitude-phase modulation.

20 Claims, 7 Drawing Sheets

Related U.S. Application Data

63/412,654, filed on Oct. 3, 2022, provisional application No. 63/409,888, filed on Sep. 26, 2022, provisional application No. 63/403,924, filed on Sep. 6, 2022, provisional application No. 63/321,879, filed on Mar. 21, 2022, provisional application No. 63/309,748, filed on Feb. 14, 2022.

(58) Field of Classification Search
CPC ............ H04L 27/2668; H04L 27/2681; H04L 27/2688; H04L 27/3863; H04L 27/3872
See application file for complete search history.

(56) References Cited

U.S. PATENT DOCUMENTS

| | | | | |
|---|---|---|---|---|
| 5,048,056 | A * | 9/1991 | Goldstein | H04L 27/3411 375/269 |
| 5,119,403 | A * | 6/1992 | Krishnan | H04L 27/3472 370/476 |
| 5,185,763 | A * | 2/1993 | Krishnan | H04L 25/03343 375/262 |
| 5,222,077 | A * | 6/1993 | Krishnan | H04L 27/3472 714/759 |
| 5,371,471 | A * | 12/1994 | Chennakeshu | H04L 25/0236 375/348 |
| 5,450,044 | A * | 9/1995 | Hulick | H04L 27/361 332/170 |
| 5,467,374 | A * | 11/1995 | Chennakeshu | H04L 25/03197 375/229 |
| 5,471,508 | A * | 11/1995 | Koslov | H04L 27/3872 375/261 |
| 5,493,586 | A * | 2/1996 | Brownlie | H04L 27/3416 375/261 |
| 5,600,672 | A * | 2/1997 | Oshima | H04N 21/2383 375/321 |
| 5,659,578 | A * | 8/1997 | Alamouti | H04L 27/3427 375/322 |
| 5,675,590 | A * | 10/1997 | Alamouti | H04L 27/3427 379/38 |
| 5,742,643 | A * | 4/1998 | Reeves | H04L 27/38 375/243 |
| 5,802,241 | A * | 9/1998 | Oshima | H04N 21/64792 375/E7.091 |
| 5,815,531 | A * | 9/1998 | Dent | H04L 27/362 375/297 |
| 5,828,695 | A * | 10/1998 | Webb | H04L 1/0025 375/228 |
| 5,892,879 | A * | 4/1999 | Oshima | H04L 27/3854 375/E7.091 |
| 5,920,228 | A * | 7/1999 | Soga | H04L 27/3872 329/304 |
| 5,931,965 | A * | 8/1999 | Alamouti | H03M 13/256 714/792 |
| 6,005,897 | A * | 12/1999 | McCallister | H03M 13/6325 714/790 |
| 6,366,177 | B1 * | 4/2002 | McCune | H03F 1/3247 455/127.5 |
| 6,542,722 | B1 * | 4/2003 | Sorrells | H03D 7/00 455/113 |
| 7,016,425 | B1 * | 3/2006 | Kraiem | H04L 27/2602 370/215 |
| 7,050,419 | B2 * | 5/2006 | Azenkot | H04L 25/03006 370/347 |
| 7,567,631 | B2 * | 7/2009 | Birkett | H04L 27/22 375/331 |
| 7,570,307 | B2 * | 8/2009 | Iha | G06T 5/20 348/607 |
| 7,639,072 | B2 * | 12/2009 | Sorrells | H03F 1/32 330/147 |
| 7,751,472 | B2 * | 7/2010 | Watanabe | H04W 12/06 375/240 |
| 7,864,883 | B2 * | 1/2011 | Park | H04L 27/34 375/298 |
| 8,223,904 | B2 * | 7/2012 | Sampath | H04B 7/0817 375/232 |
| 8,665,977 | B2 * | 3/2014 | Cheng | H04L 25/03242 375/325 |
| 8,699,607 | B2 * | 4/2014 | Seller | H04L 27/26524 375/267 |
| 8,855,186 | B2 * | 10/2014 | Tan | H04L 25/03885 375/348 |
| 8,948,292 | B1 * | 2/2015 | Taft | H04L 27/2075 375/279 |
| 8,995,568 | B1 * | 3/2015 | Wu | H04K 1/006 375/295 |
| 9,270,509 | B1 * | 2/2016 | Agon | H04L 27/361 |
| 9,294,941 | B1 * | 3/2016 | Wu | H04W 24/02 |
| 9,300,436 | B2 * | 3/2016 | Katayama | H04L 25/03057 |
| 9,344,038 | B2 * | 5/2016 | Hur | H04L 27/22 |
| 9,369,237 | B2 * | 6/2016 | Wiley | H04L 25/14 |
| 9,438,307 | B2 * | 9/2016 | Dehmas | H04B 1/7075 |
| 9,806,880 | B1 * | 10/2017 | Wiklund | H03L 7/093 |
| 10,367,586 | B2 * | 7/2019 | Yue | H04B 10/541 |
| 10,476,713 | B1 * | 11/2019 | Murakami | H04W 28/0263 |
| 10,644,926 | B1 * | 5/2020 | Lopelli | H04L 27/2003 |
| 10,680,752 | B2 * | 6/2020 | Murakami | H04L 1/0009 |
| 10,749,727 | B2 * | 8/2020 | Rafique | H04L 27/3405 |
| 10,992,411 | B2 * | 4/2021 | Haghighat | H04L 1/0076 |
| 11,032,113 | B2 * | 6/2021 | Wiklund | H04L 27/361 |
| 11,133,833 | B2 * | 9/2021 | Dorosenco | H03F 3/195 |
| 11,153,780 | B1 * | 10/2021 | Newman | H04L 43/0823 |
| 11,206,092 | B1 * | 12/2021 | Newman | H04L 27/364 |
| 11,206,169 | B1 * | 12/2021 | Newman | H04L 1/0003 |
| 11,387,935 | B2 * | 7/2022 | Newman | H04L 1/1848 |
| 11,387,961 | B2 * | 7/2022 | Newman | H04L 5/0051 |
| 11,398,876 | B2 * | 7/2022 | Newman | H04L 1/0061 |
| 11,405,131 | B2 * | 8/2022 | Newman | H04L 1/1848 |
| 11,411,795 | B2 * | 8/2022 | Newman | H04L 27/2614 |
| 11,418,281 | B2 * | 8/2022 | Newman | H04L 1/206 |
| 11,418,372 | B1 * | 8/2022 | Newman | H04L 27/38 |
| 11,456,821 | B2 * | 9/2022 | Newman | H04L 1/08 |
| 11,463,296 | B2 * | 10/2022 | Newman | H04L 1/0019 |
| 11,469,856 | B2 * | 10/2022 | Newman | H04L 1/0061 |
| 11,496,266 | B2 * | 11/2022 | Newman | H04L 27/38 |
| 11,502,893 | B1 * | 11/2022 | Newman | H04L 27/345 |
| 11,510,096 | B2 * | 11/2022 | Newman | H04L 27/364 |
| 11,516,057 | B1 * | 11/2022 | Pirot | H04L 27/2614 |
| 11,516,065 | B2 * | 11/2022 | Newman | H04L 1/0003 |
| 11,522,636 | B2 * | 12/2022 | Newman | H04L 1/0045 |
| 11,522,637 | B2 * | 12/2022 | Newman | H04L 1/02 |
| 11,522,638 | B2 * | 12/2022 | Newman | H04L 1/0003 |
| 11,522,745 | B2 * | 12/2022 | Newman | H04L 1/0045 |
| 11,528,178 | B1 * | 12/2022 | Newman | H04L 1/0003 |
| 11,546,201 | B1 * | 1/2023 | Newman | H04L 1/206 |
| 11,558,236 | B1 * | 1/2023 | Newman | H04L 25/03006 |
| 11,563,515 | B2 * | 1/2023 | Newman | H04B 17/336 |
| 11,563,617 | B2 * | 1/2023 | Harris | H04L 27/2614 |
| 11,601,150 | B1 * | 3/2023 | Newman | H04L 27/3872 |
| 11,601,320 | B1 * | 3/2023 | Newman | H04L 27/3863 |
| 11,616,668 | B1 * | 3/2023 | Newman | H04L 5/0044 370/329 |
| 11,616,679 | B2 * | 3/2023 | Newman | H04L 27/2691 370/328 |
| 11,626,955 | B2 * | 4/2023 | Newman | H04L 27/38 370/329 |
| 11,637,649 | B2 * | 4/2023 | Newman | H04L 25/03006 375/232 |
| 11,671,305 | B1 * | 6/2023 | Newman | H04L 25/03006 375/268 |
| 11,695,612 | B2 * | 7/2023 | Newman | H04L 1/0003 714/726 |
| 11,722,980 | B1 * | 8/2023 | Newman | H04W 56/005 370/350 |
| 11,736,320 | B2 * | 8/2023 | Newman | H04L 27/34 375/262 |
| 11,736,332 | B2 * | 8/2023 | Newman | H04L 1/08 375/141 |
| 11,736,333 | B2 * | 8/2023 | Newman | H04L 1/0003 375/262 |
| 11,737,044 | B1 * | 8/2023 | Newman | H04W 56/0075 370/329 |

(56) References Cited

U.S. PATENT DOCUMENTS

| | | | | |
|---|---|---|---|---|
| 11,770,207 B2* | 9/2023 | Newman | H04L 1/0026 | 370/329 |
| 11,770,209 B2* | 9/2023 | Newman | H04L 1/206 | 714/776 |
| 11,777,547 B2* | 10/2023 | Newman | H04L 27/389 | 375/340 |
| 11,777,639 B2* | 10/2023 | Newman | H04L 25/03006 | 375/232 |
| 11,784,764 B2* | 10/2023 | Newman | H04L 1/206 | 370/242 |
| 11,785,591 B2* | 10/2023 | Newman | H04W 52/50 | 370/252 |
| 11,799,707 B2* | 10/2023 | Newman | H04L 27/2675 | |
| 11,811,565 B1* | 11/2023 | Newman | H04L 27/38 | |
| 11,817,950 B2* | 11/2023 | Newman | H04L 1/0026 | |
| 11,824,667 B2* | 11/2023 | Newman | H04L 1/0045 | |
| 11,832,128 B2* | 11/2023 | Newman | H04L 27/364 | |
| 11,871,254 B2* | 1/2024 | Newman | H04W 52/146 | |
| 2001/0017897 A1* | 8/2001 | Ahn | H04L 27/0014 | 329/304 |
| 2002/0114379 A1* | 8/2002 | Uesugi | H04L 27/0008 | 375/219 |
| 2002/0154620 A1* | 10/2002 | Azenkot | H04L 27/0008 | 370/347 |
| 2003/0206073 A1* | 11/2003 | Kravtsov | H04L 27/3872 | 332/103 |
| 2004/0028146 A1* | 2/2004 | Winkler | H04L 27/2626 | 375/260 |
| 2004/0114692 A1* | 6/2004 | Matsumoto | H04L 27/3809 | 375/264 |
| 2004/0184559 A1* | 9/2004 | Ballantyne | H04L 27/362 | 375/300 |
| 2005/0195911 A1* | 9/2005 | Deng | H04L 27/36 | 375/261 |
| 2005/0249314 A1* | 11/2005 | Bock | H04L 27/38 | 375/322 |
| 2005/0271161 A1* | 12/2005 | Staszewki | H03F 1/32 | 375/297 |
| 2006/0038710 A1* | 2/2006 | Staszewski | H04L 27/361 | 341/143 |
| 2006/0105710 A1* | 5/2006 | Imamura | H04L 25/0202 | 455/39 |
| 2007/0058745 A1* | 3/2007 | Watanabe | H04L 25/03171 | 375/264 |
| 2007/0092018 A1* | 4/2007 | Fonseka | H04L 1/0054 | 375/265 |
| 2007/0223361 A1* | 9/2007 | Geile | H04L 27/2614 | 370/204 |
| 2007/0291874 A1* | 12/2007 | Park | H04L 27/34 | 375/298 |
| 2008/0112509 A1* | 5/2008 | Bock | H04L 27/2273 | 375/326 |
| 2008/0160934 A1* | 7/2008 | Nakamura | H03F 3/189 | 455/127.1 |
| 2008/0219386 A1* | 9/2008 | Chrabieh | H04L 27/3863 | 375/343 |
| 2009/0033416 A1* | 2/2009 | Rofougaran | H04L 27/361 | 330/133 |
| 2009/0034635 A1* | 2/2009 | Golitschek Edler Von Elbwart | H04L 27/183 | 375/295 |
| 2009/0034655 A1* | 2/2009 | Golitschek Edler Von Elbwart | H04L 27/18 | 375/302 |
| 2009/0074106 A1* | 3/2009 | See | H04L 27/362 | 375/300 |
| 2009/0161786 A1* | 6/2009 | Nakagawa | H03M 13/256 | 375/286 |
| 2009/0191825 A1* | 7/2009 | Georgantas | H04B 1/0483 | 455/102 |
| 2009/0252501 A1* | 10/2009 | Eiselt | H04B 10/5053 | 398/185 |
| 2009/0290631 A1* | 11/2009 | Lee | H04B 1/662 | 375/240 |
| 2009/0322587 A1* | 12/2009 | Stayton | H04L 27/26 | 342/37 |
| 2009/0324253 A1* | 12/2009 | Winzer | H04B 10/541 | 398/185 |
| 2010/0311354 A1* | 12/2010 | Stayton | G08G 5/0008 | 455/90.1 |
| 2010/0315282 A1* | 12/2010 | Stayton | H04L 27/02 | 342/40 |
| 2011/0051836 A1* | 3/2011 | Lee | H04L 27/361 | 375/268 |
| 2011/0090988 A1* | 4/2011 | Brillant | H04L 27/36 | 375/298 |
| 2011/0116535 A1* | 5/2011 | Mori | H04L 27/361 | 375/224 |
| 2011/0150133 A1* | 6/2011 | Chang | H04L 27/36 | 375/300 |
| 2011/0150143 A1* | 6/2011 | Han | H04L 25/067 | 375/329 |
| 2011/0150477 A1* | 6/2011 | Winzer | H04J 14/06 | 398/79 |
| 2011/0182382 A1* | 7/2011 | Staszewski | H04L 27/361 | 375/298 |
| 2011/0243266 A1* | 10/2011 | Roh | H04L 27/3472 | 375/261 |
| 2011/0305457 A1* | 12/2011 | Kikuchi | H04L 27/3845 | 398/79 |
| 2012/0027139 A1* | 2/2012 | Khayrallah | H04L 5/0023 | 375/347 |
| 2012/0063549 A1* | 3/2012 | Futami | H04L 25/03006 | 375/320 |
| 2012/0236969 A1* | 9/2012 | Sadowsky | H04L 25/03222 | 375/340 |
| 2012/0266040 A1* | 10/2012 | Hamkins | H03M 13/1114 | 714/752 |
| 2012/0281988 A1* | 11/2012 | Kikuchi | H04B 10/677 | 398/159 |
| 2013/0022149 A1* | 1/2013 | McCune, Jr. | H04L 27/362 | 375/302 |
| 2013/0100988 A1* | 4/2013 | Miyoshi | H04B 7/15528 | 375/211 |
| 2013/0108276 A1* | 5/2013 | Kikuchi | H04B 10/677 | 398/210 |
| 2013/0336649 A1* | 12/2013 | Essiambre | H04L 1/0003 | 398/25 |
| 2014/0147117 A1* | 5/2014 | Kikuchi | H04B 10/2507 | 398/183 |
| 2014/0169434 A1* | 6/2014 | Hewavithana | H04L 27/3836 | 375/232 |
| 2014/0363176 A1* | 12/2014 | Mizuguchi | H04B 10/65 | 398/204 |
| 2015/0163015 A1* | 6/2015 | Katayama | H04L 25/03057 | 375/285 |
| 2015/0280834 A1* | 10/2015 | Sun | H04B 10/6164 | 398/79 |
| 2015/0295625 A1* | 10/2015 | Murakami | H04L 27/36 | 375/322 |
| 2015/0311986 A1* | 10/2015 | Thomas | H04L 25/03006 | 375/230 |
| 2015/0338503 A1* | 11/2015 | Stayton | G01S 7/003 | 342/36 |
| 2015/0358648 A1* | 12/2015 | Limberg | H04L 1/0052 | 725/109 |
| 2016/0088373 A1* | 3/2016 | Li | H04L 27/38 | 398/45 |
| 2016/0197752 A1* | 7/2016 | Schmalen | H04L 27/3455 | 375/298 |
| 2016/0204967 A1* | 7/2016 | Choi | H04L 27/38 | 375/340 |
| 2016/0205565 A1* | 7/2016 | Liu | H04J 11/00 | 370/203 |
| 2017/0033743 A1* | 2/2017 | Mirzaei | H03F 3/2171 | |
| 2017/0070298 A1* | 3/2017 | Elgala | H04L 27/2697 | |
| 2017/0133989 A1* | 5/2017 | Dykstra | H03F 1/223 | |
| 2017/0180179 A1* | 6/2017 | Shi | H04L 25/023 | |

(56) References Cited

U.S. PATENT DOCUMENTS

| | | | |
|---|---|---|---|
| 2017/0302381 A1* | 10/2017 | Riani | H04B 10/25891 |
| 2017/0371990 A1* | 12/2017 | Wiklund | H04W 88/02 |
| 2018/0132122 A1* | 5/2018 | Yoo | H04W 24/08 |
| 2018/0145865 A1* | 5/2018 | Fei | H04J 14/06 |
| 2018/0227929 A1* | 8/2018 | Yoo | H04L 5/005 |
| 2018/0252796 A1* | 9/2018 | Qu | G01S 5/26 |
| 2018/0287569 A1* | 10/2018 | Xu | H03F 3/20 |
| 2018/0337815 A1* | 11/2018 | Huang | H04B 10/541 |
| 2018/0367275 A1* | 12/2018 | Nammi | H04L 5/0051 |
| 2018/0368013 A1* | 12/2018 | Yoo | H04L 5/0048 |
| 2019/0149376 A1* | 5/2019 | Dai | H04B 1/00 375/329 |
| 2019/0190677 A1* | 6/2019 | Kim | H04W 72/23 |
| 2019/0326964 A1* | 10/2019 | Li | H04B 7/0473 |
| 2019/0349240 A1* | 11/2019 | Saito | H04L 27/2621 |
| 2020/0028725 A1* | 1/2020 | Limberg | H04L 25/067 |
| 2020/0091608 A1* | 3/2020 | Alpman | H01Q 9/0414 |
| 2020/0099558 A1* | 3/2020 | Wiklund | H04B 1/0483 |
| 2020/0220689 A1* | 7/2020 | Hessler | H04L 27/2613 |
| 2020/0220763 A1* | 7/2020 | Montorsi | H04L 27/3405 |
| 2020/0235979 A1* | 7/2020 | Yokomakura | H04W 88/02 |
| 2020/0296736 A1* | 9/2020 | Yokomakura | H04W 72/12 |
| 2020/0322010 A1* | 10/2020 | Kim | H04L 25/0224 |
| 2020/0351141 A1* | 11/2020 | Bicais | H04L 1/0003 |
| 2021/0044372 A1* | 2/2021 | Yang | H04L 27/2613 |
| 2021/0058282 A1* | 2/2021 | Murakami | H04B 7/0682 |
| 2021/0105166 A1* | 4/2021 | Khoshnevisan | H04W 72/23 |
| 2021/0119734 A1* | 4/2021 | Mheich | H04L 27/26 |
| 2021/0320747 A1* | 10/2021 | Yoshioka | H04L 1/0009 |
| 2021/0385118 A1* | 12/2021 | Umehara | H04L 27/0012 |
| 2022/0140938 A1* | 5/2022 | Newman | H04L 1/0045 370/328 |
| 2022/0140940 A1* | 5/2022 | Newman | H04L 1/1848 714/26 |
| 2022/0150022 A1* | 5/2022 | Newman | H04L 5/0051 |
| 2022/0173954 A1* | 6/2022 | Newman | H04L 1/1809 |
| 2022/0200776 A1* | 6/2022 | Carlton | H04L 25/03012 |
| 2022/0247512 A1* | 8/2022 | Newman | H04L 1/0048 |
| 2022/0271761 A1* | 8/2022 | Zhu | H03L 7/089 |
| 2022/0294683 A1* | 9/2022 | Chakraborty | H03F 3/45475 |
| 2022/0295344 A1* | 9/2022 | Newman | H04L 43/0823 |
| 2022/0311578 A1* | 9/2022 | Newman | H04L 5/0051 |
| 2022/0353011 A1* | 11/2022 | Newman | H04W 76/18 |
| 2022/0393932 A1* | 12/2022 | Newman | H04L 27/345 |
| 2023/0031261 A1* | 2/2023 | Newman | H04L 27/3872 |
| 2023/0039263 A1* | 2/2023 | Newman | H04L 25/03006 |
| 2023/0046269 A1* | 2/2023 | Newman | H04L 27/2607 |
| 2023/0057684 A1* | 2/2023 | Newman | H04L 27/3872 |
| 2023/0058691 A1* | 2/2023 | Newman | H04L 5/0048 |
| 2023/0060032 A1* | 2/2023 | Newman | H04L 27/22 |
| 2023/0081108 A1* | 3/2023 | Newman | H04L 5/0051 370/329 |
| 2023/0085866 A1* | 3/2023 | Newman | H04L 27/38 |
| 2023/0113691 A1* | 4/2023 | Kim | H04L 5/0094 370/330 |
| 2023/0124141 A1* | 4/2023 | Eistein | H04L 27/2688 375/262 |
| 2023/0129333 A1* | 4/2023 | Newman | H04L 5/0053 370/329 |
| 2023/0155796 A1* | 5/2023 | Newman | H04L 27/2675 |
| 2023/0156648 A1* | 5/2023 | Newman | H04J 11/00 |
| 2023/0164019 A1* | 5/2023 | Newman | H04L 27/3872 375/268 |
| 2023/0178891 A1* | 6/2023 | Newman | H01Q 1/246 342/372 |
| 2023/0208461 A1* | 6/2023 | Newman | H04L 27/389 375/340 |
| 2023/0231645 A1* | 7/2023 | Newman | H04L 27/38 375/232 |
| 2023/0239854 A1* | 7/2023 | Newman | H04W 52/146 |
| 2023/0254198 A1* | 8/2023 | Newman | H04L 27/3863 375/262 |
| 2023/0261811 A1* | 8/2023 | Newman | H04L 1/201 370/252 |
| 2023/0353428 A1* | 11/2023 | Newman | H04L 27/38 |
| 2023/0387952 A1* | 11/2023 | Newman | H04L 27/389 |
| 2024/0031205 A1* | 1/2024 | Newman | H04L 27/38 |
| 2024/0080126 A1* | 3/2024 | Newman | H04L 1/0003 |
| 2024/0080231 A1* | 3/2024 | Newman | H04L 27/2605 |
| 2024/0080234 A1* | 3/2024 | Newman | H04L 27/3872 |
| 2024/0154679 A1* | 5/2024 | Newman | H04W 24/10 |

* cited by examiner

MODULATION AND DEMODULATION FOR ENHANCED NOISE MARGINS IN 5G AND 6G

PRIORITY CLAIMS AND RELATED APPLICATIONS

This application is a continuation of U.S. patent application Ser. No. 17/212,905, entitled "Demodulation Using Two Modulation Schemes in 5G and 6G", filed Jun. 22, 2023, which is a continuation of U.S. patent application Ser. No. 17/994,876, entitled "Multiplexed Amplitude-Phase Modulation for 5G/6G Noise Mitigation", filed Nov. 28, 2022, which claims the benefit of U.S. Provisional Patent Application Ser. No. 63/426,853, entitled "Multiplexed Amplitude-Phase Modulation for 5G/6G Noise Mitigation", filed Nov. 22, 2022, and U.S. Provisional Patent Application Ser. No. 63/418,784, entitled "Demodulation for Phase-Noise Mitigation in 5G and 6G", filed Oct. 24, 2022, and U.S. Provisional Patent Application Ser. No. 63/412,654, entitled "Guard-Space Phase-Tracking Reference Signal for 5G and 6G Networking", filed Oct. 3, 2022, and U.S. Provisional Patent Application Ser. No. 63/403,924, entitled "Phase-Noise Mitigation at High Frequencies in 5G and 6G", filed Sep. 6, 2022, and U.S. Provisional Patent Application Ser. No. 63/409,888, entitled "Single-Branch Reference for High-Frequency Phase Tracking in 5G and 6G", filed Sep. 26, 2022, and U.S. Provisional Patent Application Ser. No. 63/321,879, entitled "Low-Complexity Demodulation of 5G and 6G Messages", filed Mar. 21, 2022, and U.S. Provisional Patent Application Ser. No. 63/309,748, entitled "Error Detection and Correction in 5G/6G Pulse-Amplitude Modulation", filed Feb. 14, 2022, all of which are hereby incorporated by reference in their entireties.

FIELD OF THE INVENTION

The disclosure pertains to mitigation of amplitude noise and phase noise in wireless messaging, and particularly to phase-noise mitigation at high frequencies.

BACKGROUND OF THE INVENTION

Wireless communication at very high frequencies, such as tens to hundreds of GHz, is needed for the massively increased demand in bandwidth and throughput expected in 5G and 6G. However, phase noise is an increasing problem at higher frequencies, preventing full usage of the bandwidth for messaging. What is needed is means for mitigating the phase noise so that the promise of high-speed messaging at high frequencies can be at least partially realized.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY OF THE INVENTION

In a first aspect, there is a method for a wireless receiver to demodulate a message, the method comprising: receiving a demodulation reference modulated, by a transmitter, according to an amplitude-phase modulation scheme comprising Namp amplitude levels and Nphase phase levels; determining, according to the demodulation reference, the Namp amplitude levels and the Nphase phase levels of the modulation scheme; receiving a message modulated, by the transmitter, according to the amplitude-phase modulation scheme, the message comprising message elements, each message element comprising a resource element of a resource grid, wherein each message element, as received by the wireless receiver, contains a received wave comprising a received wave amplitude and a received wave phase; for each message element, separating the received wave into an I-branch and an orthogonal Q-branch, the I-branch comprising I-branch amplitude and the Q-branch comprising a Q-branch amplitude, of a QAM (quadrature amplitude modulation) modulation scheme; for each message element, calculating the received wave amplitude according to a square root of a sum of the I-branch amplitude squared plus the Q-branch amplitude squared, and calculating the received wave phase according to an arctangent of a ratio of the Q-branch amplitude divided by the I-branch amplitude; and demodulating the message by selecting a particular amplitude level, of the Namp amplitude levels, closest to the received wave amplitude, and selecting a particular phase level, of the Nphase phase levels, closest to the received wave phase.

In another aspect, there is a method for a transmitter of a base station of a wireless network to mitigate message faults, the method comprising: using a modulation scheme comprising amplitude modulation multiplexed with phase modulation, the amplitude modulation according to integer Namp amplitude levels and the phase modulation according to integer Nphase phase modulation levels; determining a rate of amplitude faults and phase faults, wherein an amplitude fault comprises a message modulated, by the transmitter, according to a particular amplitude level of the Namp amplitude levels, and then demodulated, by a receiver, according to a different amplitude level, and wherein a phase fault comprises a message modulated, by the transmitter, according to a particular phase level of the Nphase phase levels, and then demodulated, by a receiver, according to a different phase level; selecting a second modulation scheme comprising integer Mamp amplitude levels and integer Mphase phase levels, wherein Mamp and Mphase are selected according to the rate of amplitude faults and the rate of phase faults; and wherein either Mamp is different from Namp, or Mphase is different from Nphase, or both.

In another aspect, there is a method for a wireless transmitter to optimize communication throughput, the method comprising: using a first modulation scheme comprising amplitude modulation multiplexed with phase modulation, the amplitude modulation according to integer Namp amplitude levels and the phase modulation according to a first plurality of phase levels, wherein the phase levels of the first plurality are uniformly spaced apart by a first phase separation; determining a rate of phase faults, wherein a phase fault comprises a message transmitted, by the transmitter, according to a particular phase level of the first plurality, and demodulated, by a receiver, according to a different phase level than the particular phase level; and when the rate of phase faults exceeds a predetermined threshold, changing to a second modulation scheme comprising a second plurality of phase levels uniformly spaced apart by a second phase separation, wherein the second phase separation is larger than the first phase separation.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this disclosure.

These and other embodiments are described in further detail with reference to the figures and accompanying detailed description as provided below.

BRIEF DESCRIPTION OF THE DRAWINGS

Like reference numerals refer to like elements throughout.

DETAILED DESCRIPTION

Figure 1A:
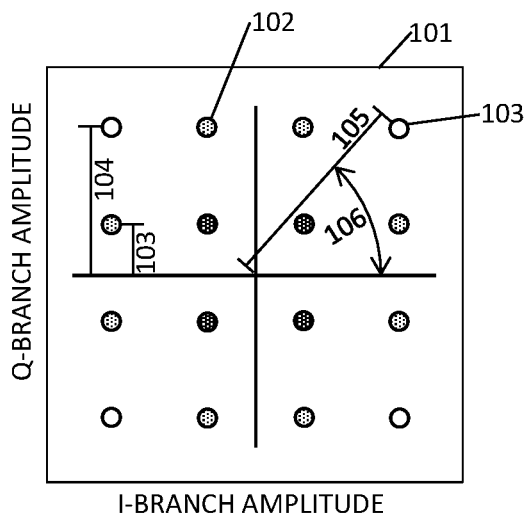
FIG. 1A is a schematic showing an exemplary embodiment of a 16QAM constellation chart with orthogonal amplitude-modulated branches, according to some embodiments.

Systems and methods disclosed herein (the "systems" and "methods", also occasionally termed "embodiments" or "arrangements" or "versions" or "examples", generally according to present principles) can provide urgently needed wireless communication protocols for mitigating the effects of phase noise at high frequencies planned for late 5G and 6G communications. Disclosed herein are methods to prepare and transmit a message according to a first modulation scheme, and then to receive and demodulate the message according to a second modulation scheme with different properties. The first modulation scheme, in some embodiments, is multiplexed amplitude and phase modulation, which can be configured to provide enhanced phase-noise margins and versatility, especially for generating advantageous non-square modulation schemes. The second modulation scheme, in some embodiments, uses two orthogonal amplitude-modulated branches, which may provide convenient signal processing of quadrature components, as opposed to processing the whole received wave. Examples show how using two different modulation schemes for transmission and reception can enable mitigation of phase noise and amplitude noise. Further examples show how to diagnose message faults according to the amplitude and phase deviations of the demodulated signals, and how to select a particular modulation scheme to combat observed fault types, including phase faults.

The examples presented below are suitable for adoption by a wireless standards organization. Advanced modulation options configured to provide large phase margins, when presented as a wireless standard, may enable future wireless users to access high-frequency bands that would otherwise be precluded due to phase noise, as well as enhanced reliability in low-medium frequency bands, at zero or negligible cost in power and resources.

Terms herein generally follow 3GPP (third generation partnership project) standards, but with clarification where needed to resolve ambiguities. As used herein, "5G" represents fifth-generation, and "6G" sixth-generation, wireless technology in which a network (or cell or LAN Local Area Network or RAN Radio Access Network or the like) may include a base station (or gNB or generation-node-B or eNB or evolution-node-B or AP Access Point) in signal communication with a plurality of user devices (or UE or User Equipment or user nodes or terminals or wireless transmit-receive units) and operationally connected to a core network (CN) which handles non-radio tasks, such as administration, and is usually connected to a larger network such as the Internet. The time-frequency space is generally configured as a "resource grid" including a number of "resource elements", each resource element being a specific unit of time termed a "symbol period" or "symbol-time", and a specific frequency and bandwidth termed a "subcarrier" (or "subchannel" in some references). Symbol periods may be termed "OFDM symbols" (Orthogonal Frequency-Division Multiplexing) in references. The time domain may be divided into ten-millisecond frames, one-millisecond subframes, and some number of slots, each slot including 14 symbol periods. The number of slots per subframe ranges from 1 to 8 depending on the "numerology" selected. The frequency axis is divided into "resource blocks" (also termed "resource element groups" or "REG" or "channels" in references) including 12 subcarriers, each subcarrier at a slightly different frequency. The "numerology" of a resource grid corresponds to the subcarrier spacing in the frequency domain. Subcarrier spacings of 15, 30, 60, 120, and 240 kHz are defined in various numerologies. Each subcarrier can be independently modulated to convey message information. Thus a resource element, spanning a single symbol period in time and a single subcarrier in frequency, is the smallest unit of a message. "Classical" amplitude-phase modulation refers to message elements modulated in both amplitude and phase, whereas "quadrature" or "PAM" (pulse-amplitude) modulation refers to two signals, separately amplitude-modulated, and then multiplexed and transmitted with a 90-degree phase shift between them. The two signals may be called the "I" and "Q" branch signals (for In-phase and Quadrature-phase) or "real and imaginary" among others. Standard modulation schemes in 5G and 6G include BPSK (binary phase-shift keying), QPSK (quad phase-shift keying), 16QAM (quadrature amplitude modulation with 16 modulation states), 64QAM, 256QAM and higher orders. Most of the examples below relate to QPSK or 16QAM, with straightforward extension to the other levels of modulation. QPSK is phase modulated but not amplitude modulated. 16QAM may be modulated according to PAM which exhibits two phase levels at zero and 90 degrees (or in practice, for carrier suppression, ±45 degrees) and four amplitude levels including two positive and two negative amplitude levels, thus forming 16 distinct modulation states. For comparison, classical amplitude-phase modulation with 16 states includes four positive amplitude levels and four phases of the overall wave signal, which are multiplexed to produce the 16 states of the modulation scheme. "SNR" (signal-to-noise ratio) and "SINR" (signal-to-interference-and-noise ratio) are used interchangeably unless specifically indicated. "RRC" (radio resource control) is a control-type message from a base station to a user device. "Digitization" refers to repeatedly measuring a waveform using, for example, a fast ADC (analog-to-digital converter) or the like. An "RF mixer" is a device for multiplying an incoming signal with a local oscillator signal, thereby selecting one component of the incoming signal.

In addition to the 3GPP terms, the following terms are defined herein. Although in references a modulated resource element of a message may be referred to as a "symbol", this may be confused with the same term for a time interval ("symbol-time"), among other things. Therefore, each modulated resource element of a message is referred to as a "modulated message resource element", or more simply as a "message element", in examples below. A "demodulation reference" is one or more modulated "reference resource elements" or "reference elements" modulated according to the modulation scheme of the message and configured to exhibit levels of the modulation scheme (as opposed to conveying data). A "calibration set" is one or more predetermined amplitude levels and/or phase levels of a modulation scheme, typically determined by a receiver from a demodulation reference. A "short-form" demodulation reference is a demodulation reference that exhibits only selected amplitude levels, such as the maximum and/or minimum amplitude levels, of the modulation scheme, from which the receiver can determine any intermediate levels by calculation. "RF" or radio-frequency refers to electromagnetic waves in the MHz (megahertz) or GHz (gigahertz) frequency ranges. The "raw" or "overall" or "waveform" signal is the as-received waveform before separation of the quadrature branch signals, and includes a raw-signal amplitude and a raw-signal phase. "Phase noise" is random noise or time jitter that alters the overall phase of a received signal, usually without significantly affecting the overall amplitude. "Phase-noise tolerance" or "phase-noise margin" is a measure of how much phase alteration can be imposed on a message element without causing a demodulation fault. "Amplitude noise" includes any noise or interference that primarily affects amplitudes of received signals. Interference due to competing signals is treated as noise herein, unless otherwise specified. A "faulted" message has at least one incorrectly demodulated message element. A "phase fault" is a message element demodulated as a state differing in phase from the intended modulation state, whereas an "amplitude fault" is a message element demodulated as a state differing in amplitude from the intended modulation state.

Referring to quadrature or QAM or PAM modulation, an "I-Q" space is an abstract two-dimensional space defined by an I-branch amplitude and an orthogonal Q-branch amplitude, in which each transmitted message element occupies one of several predetermined I-Q states of a modulation scheme. The orthogonal branches are sometimes called "real" and "imaginary", and the I-Q space is sometimes called the "complex plane". The incoming signal to the receiver may be termed the "overall" waveform or signal, which includes an "overall amplitude" and an "overall phase". The receiver can then process the overall signal by separating it into two orthogonal branches as mentioned. The receiver can also combine the branch amplitudes to determine a "sum-signal", which is the vector sum of the I and Q branch signals and generally approximates the overall waveform. A vector sum is a sum of two vectors, which in this case represent the amplitudes and phases of the two orthogonal branches in I-Q space. The sum-signal has a "sum-signal amplitude", equal to the square root of the sum of the I and Q branch amplitudes squared (the "root-sum-square" of I and Q), and a "sum-signal phase", equal to the arctangent of the ratio of the I and Q signal amplitudes (plus an optional base phase, ignored herein). Thus the sum-signal represents the overall received waveform, aside from signal processing errors in the receiver—which are generally negligible and are ignored herein.

When the message element is received at a receiver, the signal may be substantially different from the transmitted wave due to added phase noise and amplitude noise. Normally the receiver separates the received wave into orthogonal I and Q branches which are affected in complex ways by the noise. Examples below show (a) how the transmitted signal can be modulated to provide enhanced phase-noise or amplitude-noise margins, (b) how the receiver can quantitatively determine the amplitude and phase noise effects, and (c) how the receiver can subtract amplitude and phase noise from the received message. Further examples show how a network can monitor various types of noise, and can select a different modulation scheme (such as a non-square modulation scheme) to combat specific noise problems.

Most of the examples are presented using 16QAM and the corresponding multiplexed amplitude-phase modulation scheme of 16 states, however the principles and conclusions apply equally to higher-order QAM, other quadrature modulation schemes, and many other modulation schemes in general.

Turning now to the figures, examples show how modulation schemes are susceptible to phase noise at high frequencies.

FIG. 1A is a schematic showing an exemplary embodiment of a 16QAM constellation chart, according to some embodiments. As depicted in this non-limiting example, a modulation scheme 101 includes 16 allowed modulation states 102, each allowed state determined by an I-branch signal and a Q-branch signal orthogonal to the I-branch signal (for example, the Q-branch phase-modulated at 90 degrees relative to the I-branch). The horizontal axis shows the amplitude modulation of the I-branch signal, and the vertical axis shows the amplitude modulation of the Q-branch signal. Each branch is amplitude-modulated at one of the predetermined branch amplitude levels of the modulation scheme. In this case, the predetermined branch amplitude levels are −3, −1, +1, and +3 (here and elsewhere, amplitudes are given in arbitrary units). For example, the distance 103 may be 1 unit, and the distance 104 may be 3 units. The various branch amplitude levels are equally separated and symmetrical around zero. The central cross-shape represents zero amplitude. Negative branch amplitude levels are equivalent to a 180-degree phase change. There are 16 states, as expected for 16QAM. A receiver can receive a message element modulated according to this modulation scheme, and can extract the I and Q branches separately by analog or digital signal-processing means. The receiver can then measure the amplitudes of those two branches, compare the measured amplitude values to a predetermined set of branch amplitude levels, select the closest match to each of the message branch amplitude, and thereby determine the modulation state of the message element. 16QAM encodes 4 bits per message element.

The received waveform, before separation of the two branches, has an overall amplitude 105 and an overall phase 106, as indicated for a particular state 103. The overall amplitude 105 is the radius of the state 103 from the origin, and the overall phase 106 is the angle relative to the horizontal axis (ignoring carrier suppression, etc.). Thus each state 102, 103 can be described in terms of the I and Q branch amplitudes, or the overall amplitude and phase, depending on the task.

Each state 103 in the figure is represented as an icon shaded according to the overall amplitude, with dark gray for the lowest overall amplitude, light gray for the intermediate overall amplitude, and white for the highest overall amplitude. Although there are four branch amplitude levels in 16QAM, there are only three overall wave amplitudes, as indicated.

Figure 1B:
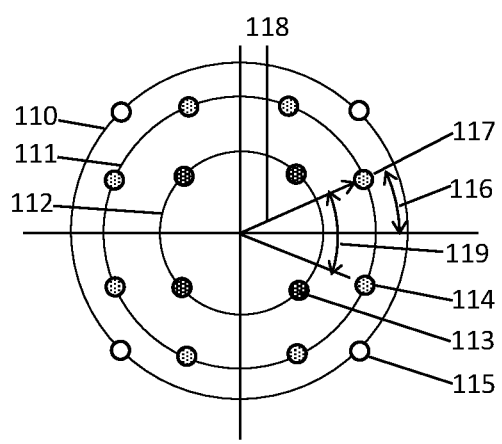
FIG. 1B is a polar plot showing an exemplary embodiment of the overall wave amplitude and phase of 16QAM states, according to prior art.

FIG. 1B is a polar plot showing an exemplary embodiment of the states of 16QAM, according to some embodiments. As depicted in this non-limiting example, the states of 16QAM are shaded as in the previous figure, according to the corresponding overall amplitude which is indicated by circles 110, 111, 112. The lowest overall amplitude is shown as a small circle 112 and the four low-amplitude states are shown as dark gray dots 113. The four states with the largest overall amplitude are shown as white dots 115 on the large circle 110. Eight states in 16QAM have the same intermediate amplitude, as shown in light gray 114 on the middle circle 111. Also shown is an arrow 118 indicating the overall amplitude of a particular state 117, and an arc 116 indicating the overall phase of the state 117.

The overall amplitude 118 equals the square root of the sum of the squares of the I and Q branch amplitudes (that is, the "root-sum-square" of I and Q), while the overall phase 116 equals the arctangent of the Q amplitude divided by the I amplitude. To convert back to QAM, the I branch amplitude equals the overall amplitude 118 times the cosine of the overall phase 116, and the Q branch amplitude equals the overall amplitude 118 times the sine of the overall phase 116. Conversion between the quadrature parameters and the overall wave parameters is thus straightforward.

Although the branch amplitudes are modulated with four branch amplitude levels in 16QAM, the actual transmitted waveform has only three distinct amplitudes, given by the three circles 110, 111, 112. This is because eight of the 16QAM states have the same overall amplitude. For 16QAM, the intermediate amplitude is 3.16 arbitrary units (that is, $\sqrt{(I^2 \pm Q^2)} = \sqrt{(3^2 + 1^2)} = 3.16$ for each of the gray dots 113). The three amplitude values of the transmitted waveforms are not equally spaced, as shown by the three circles 110, 111, 112 having non-equally-spaced radii (specifically 1.41, 3.16, and 4.24 arbitrary units in this case). Thus, although the branch amplitudes are modulated according to four amplitude levels, the transmitted and received wave has only three distinct amplitude levels, in 16QAM. The unequal spacing of the overall waveform amplitudes can limit the amplitude noise immunity, as described below.

Also shown is an arc-arrow 119 indicating the phase difference between two of the intermediate-amplitude states. Due to the nonlinearities in QAM, that phase difference 119 is only 36.9 degrees. Due to the close spacing between adjacent states, 16QAM and the other QAM modulation schemes can result in phase faulting at high frequencies and high noise environments.

Figure 1C:
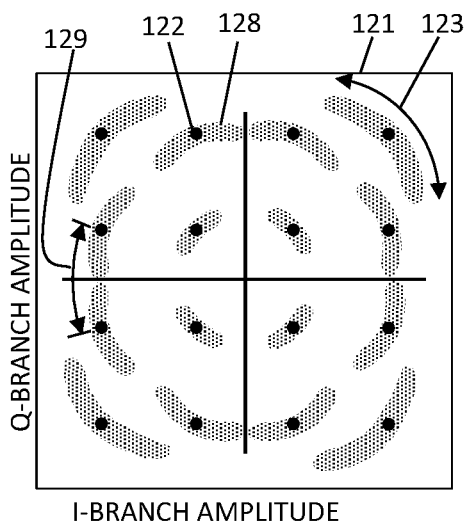
FIG. 1C is a schematic showing an exemplary embodiment of a constellation chart of the states of FIG. 1A including phase noise, demodulated according to orthogonal amplitude-modulated branches, according to some embodiments.

FIG. 1C is a schematic showing an exemplary embodiment of the effect of phase noise on a 16QAM constellation chart, according to some embodiments. As depicted in this non-limiting example, the modulation states 122 of a 16QAM constellation chart 121 can be distorted angularly ("smeared out") by phase noise in a characteristic way, as indicated by phase distortion clouds 128 which have an angular width as indicated by an arc-arrow 123. The depicted distortions would be caused by moderate phase noise at moderate frequencies; at high frequencies it is much worse. If the same modulation scheme were attempted at the much higher frequencies planned for future wireless operation, the phase noise would be much larger than depicted, and the phase-noise clouds would substantially overlap, resulting in frequent message faults. For example, a particular pair of 16QAM states, indicated by an arc-arrow 129, are separated by only 36.9 degrees of phase, as mentioned. This limits the phase noise tolerance of 16QAM, and indicates the need for strategies to mitigate phase noise and enable communications at high frequencies.

Figure 2A:
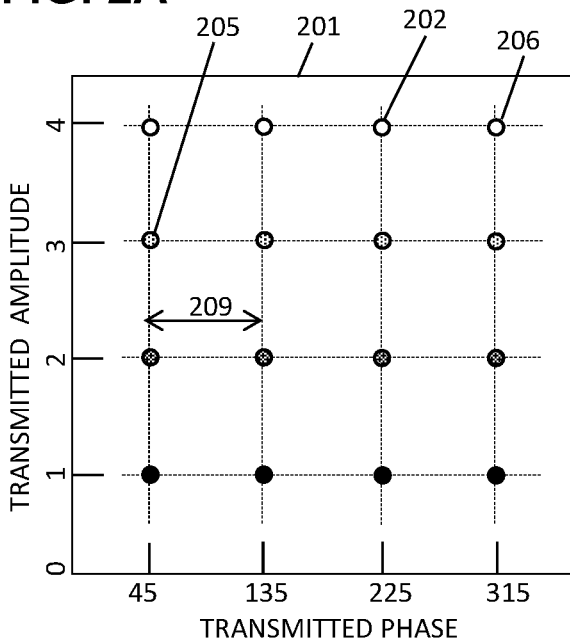
FIG. 2A is a schematic showing an exemplary embodiment of a modulation scheme with multiplexed amplitude and phase modulation, according to some embodiments.

FIG. 2A is a schematic showing an exemplary embodiment of a modulation scheme with multiplexed amplitude and phase modulation, according to some embodiments. As depicted in this non-limiting example, a modulation table 201 includes 16 states 202, 205, 206 modulated in phase and amplitude of the overall waveform. The phase separation between adjacent states is 90 degrees, as indicated by an arc-arrow 209. The depicted amplitude levels (1,2,3,4 units) and phase levels (45, 135, 225, 315 degrees) are equally spaced apart. Hence, each state 202, 205, 206 is separated by 90 degrees from its phase-adjacent neighbors, and by one amplitude unit from its amplitude-adjacent neighbors. The icons of each state are shaded as white for the highest amplitude states, light gray for the next-highest, then dark gray, then black for the lowest amplitude states.

Although the modulation table 201 appears similar to the constellation chart 101 of FIG. 1A, the meaning is quite different. The constellation chart 101 is a plot of the in-phase amplitude versus the quadrature-phase amplitude, whereas the modulation table 201 shows the overall wave amplitude versus the overall wave phase. As demonstrated below, the two schemes (16QAM and multiplexed amplitude-phase modulation with 16 states) provide the same bits per message element, but they differ greatly in their noise sensitivities.

Figure 2B:
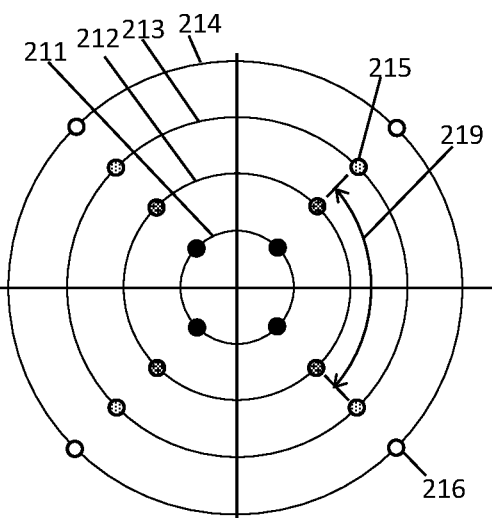
FIG. 2B is a polar plot showing an exemplary embodiment of the overall wave amplitude and phase of the states of FIG. 2A, according to some embodiments.

FIG. 2B is a polar plot showing an exemplary embodiment of the overall wave amplitude and phase of the states of FIG. 2A, according to some embodiments. As depicted in this non-limiting example, circles 211, 212, 213, 214 correspond to the four amplitudes of the modulation table 201, while four phase angles such as 219 correspond to the four phase levels of the modulation table 201. The state icons are shaded in the same was as in FIG. 2A, with white representing the highest amplitude 214, and black representing the lowest amplitude 211. A particular state 215 corresponds to state 205 in the previous figure. State 216 here corresponds to state 206 in the previous figure, that is, the state with the highest overall amplitude and highest overall phase. In addition, the polar plot shows that the lowest and highest phase levels are in fact separated by the same phase angle (90 degrees) as the other phases, although the modulation table does not make that obvious The separation between phase-adjacent states is indicated by an arc-arrow 219.

Figure 2C:
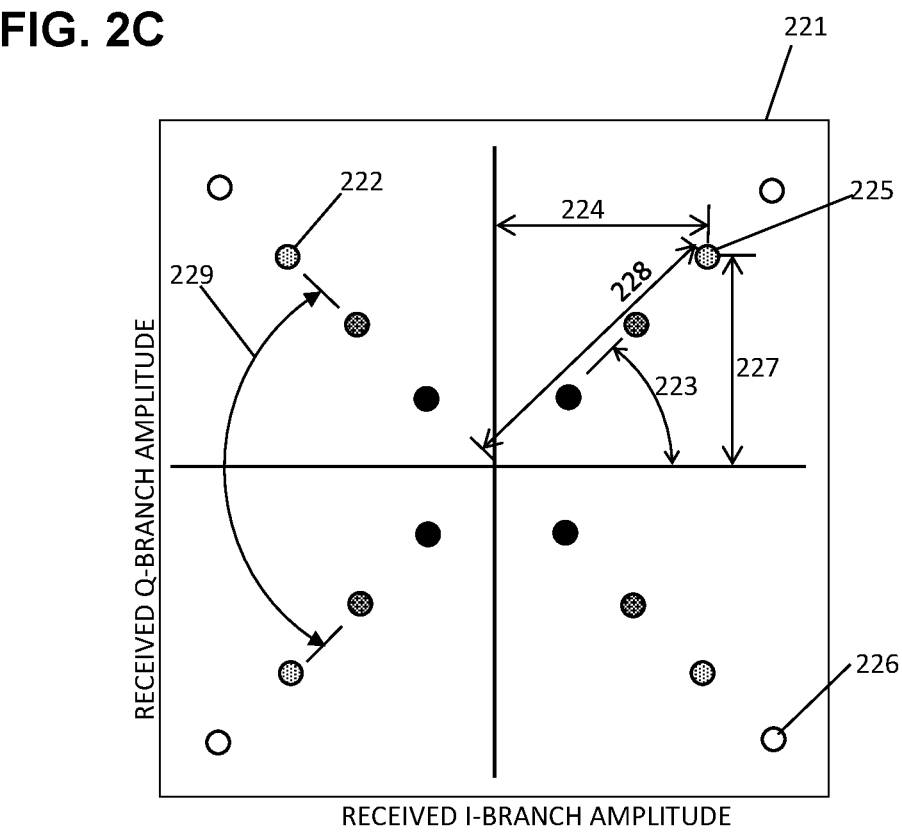
FIG. 2C is a schematic showing an exemplary embodiment of a constellation chart of the states of FIG. 2A, but demodulated according to orthogonal amplitude-modulated branches, according to some embodiments.

FIG. 2C is a schematic showing an exemplary embodiment of a constellation chart of the states of FIG. 2A, transmitted according to multiplexed amplitude-phase modulation, but received and demodulated according to orthogonal amplitude-modulated branches, according to some embodiments. As depicted in this non-limiting example, a constellation chart 221 of states 222 is shown as received and demodulated by a receiver. The constellation chart shows the I-branch amplitudes and Q-branch amplitudes of states 222 as received. Those states were modulated, by the transmitter, in amplitude and phase (as in FIG. 2A), but then were demodulated by the receiver in orthogonal branch amplitudes (as in FIG. 1A).

The four radial groups correspond to each phase column of FIG. 2A. For example, state 225 here corresponds to states 215 and 205 in the previous figures. State 226 here is the same as 216 and 206. The I and Q branch amplitudes of state 225 are specifically called out as 224 and 227. In contrast, the overall waveform amplitude of state 225 is shown as the radius line 228, and the overall waveform phase is given by the angle 223. Hence each state, originally modulated according to equally-spaced-apart amplitude levels and equally-spaced-apart phase levels of the overall waveform, now appear as the resulting I and Q amplitudes of the figure.

The constellation chart of FIG. 2C provides larger phase-noise margins than 16QAM, as shown by the arc-angle 229. Specifically, the phase separation between adjacent phase states is 90 degrees here, whereas the closest phase separation is only 36.9 degrees when they were modulated according to QAM (such as 129 in FIG. 1C). The improved phase separations are preserved in the final demodulated states, whether the receiver demodulates according to the overall amplitude-phase or by QAM.

The modulation scheme of FIG. 2C includes 16 states which are originally modulated as the amplitude and phase of the overall waveform, and transmitted as a sine wave with that amplitude and phase. The sine wave was then received by a receiver and demodulated according to orthogonal branch amplitudes, with the I and Q branch amplitudes as shown. Since this scheme provides noise margins greater, by a factor of 2.4, greater than 16QAM, it may be suitable for high-frequency communications where the QAM schemes are prohibited due to phase faulting.

In addition, the amplitude levels are equally spaced apart as shown. The states originally modulated as multiplexed amplitude-phase, and then demodulated as orthogonal branches, are equally-spaced-apart in both the I and Q directions, as well as in the overall wave amplitude. In contrast, the overall amplitude states of 16QAM are not equally spaced apart. The unequal separations between the overall amplitude levels of 16QAM, and other QAM schemes in general, which impacts the amplitude noise margin. As a further distinction, the number of overall amplitude levels is four with multiplexed amplitude-phase modulation, but only three with quadrature modulation, as shown above.

The receiver can calibrate the predetermined branch amplitude levels using a demodulation reference proximate to the message. For example, the demodulation reference may be a short-form demodulation reference that exhibits the maximum branch amplitudes of QAM and the maximum overall waveform amplitude of multiplexed amplitude-phase modulation. In that case, a single short-form demodulation reference can be used to calibrate both demodulation schemes, including the branch amplitudes of QAM demodulation, and the overall waveform phase and amplitude levels. The overall waveform amplitude levels are generally √2 times the corresponding branch amplitude levels.

The example demonstrates that enhanced phase noise margins can be obtained by modulating messages in equally-spaced amplitude and phase levels of the transmitted wave, and then demodulated by the receiver in the usual way, according to orthogonal I and Q branch amplitudes. Importantly, the wide phase separation between the phase-modulated states is preserved when the signal is demodulated according to QAM.

Figure 3:
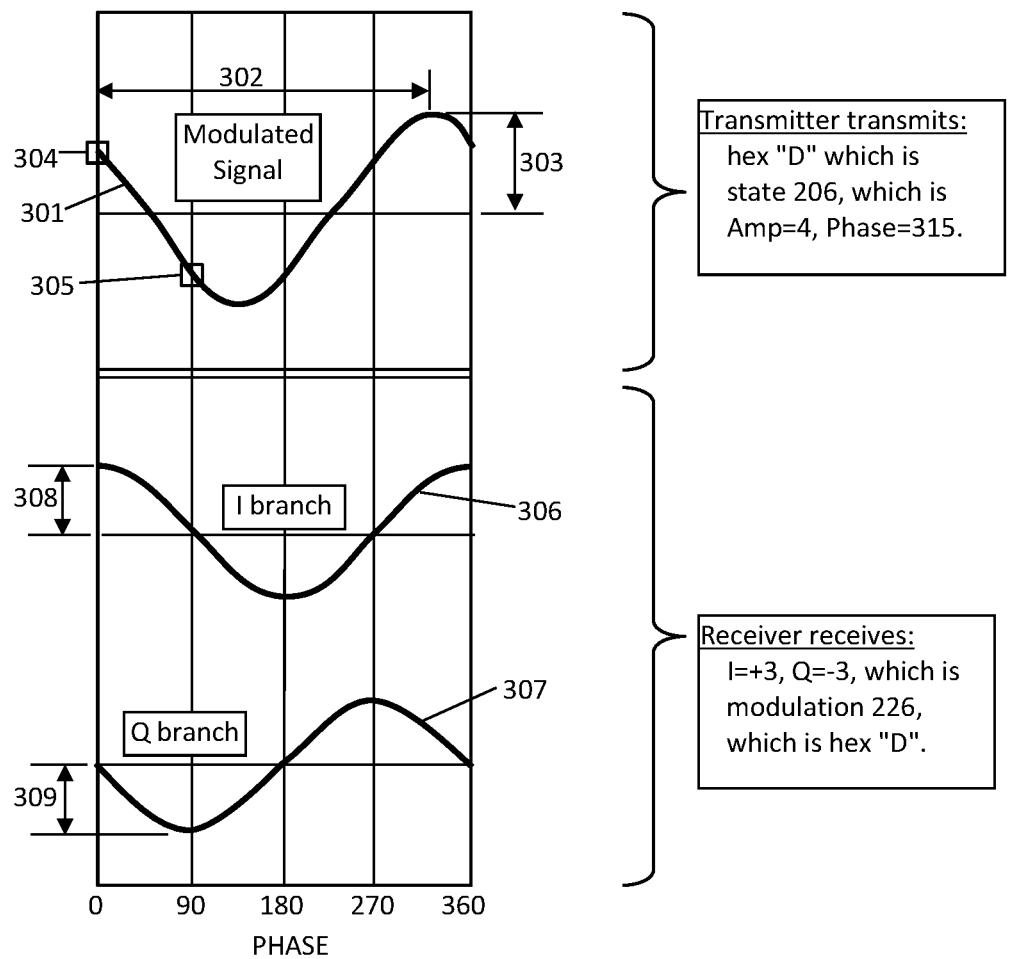
FIG. 3 is a schematic showing an exemplary embodiment of a wave modulated according to overall amplitude and phase, and the same wave decomposed into orthogonal branches, according to some embodiments.

FIG. 3 is a schematic showing an exemplary embodiment of a wave modulated according to overall amplitude and phase, and the same wave decomposed into orthogonal branches, according to some embodiments. As depicted in this non-limiting example, a wave 301 is plotted versus phase (or equivalently, versus time) as modulated by a transmitter. The wave 301 has a phase 302 (to the peak) and an amplitude 303 as shown. The particular wave configuration corresponds to state 206 in FIG. 2A, which in one scheme corresponds to a hexadecimal "D" in a message element.

A receiver has received this wave 301 and separated it into an I-branch component 306 at zero degrees, plus a Q-branch component 307 at 90 degrees. The I-branch amplitude 308 is the value 304 (box) of the overall wave 301 at zero phase (where the Q-branch passes through zero). Likewise, the Q-branch amplitude 309 is the value 305 of the overall wave 301 at 90 degrees (where the I-branch passes through zero). Thus the overall wave 301 is the sum of the two branch waves 306, 307.

The receiver, upon measuring the two branch amplitudes 308, 309, may determine that the I-branch amplitude 308 is maximally positive, while the Q-branch amplitude 309 is maximally negative, and therefore the received branch amplitudes correspond to state 226 of FIG. 2C, which corresponds to state 206 of FIG. 2A, which corresponds to a hex-D as mentioned. Thus the receiver can readily process a message that is modulated in amplitude and phase but demodulated in two orthogonal branch amplitude levels. The receiver can then determine the content of the message element by comparing the branch amplitudes to the set of predetermined branch amplitude levels, selecting the closest of the predetermined branch amplitude levels in each case.

Figure 4:
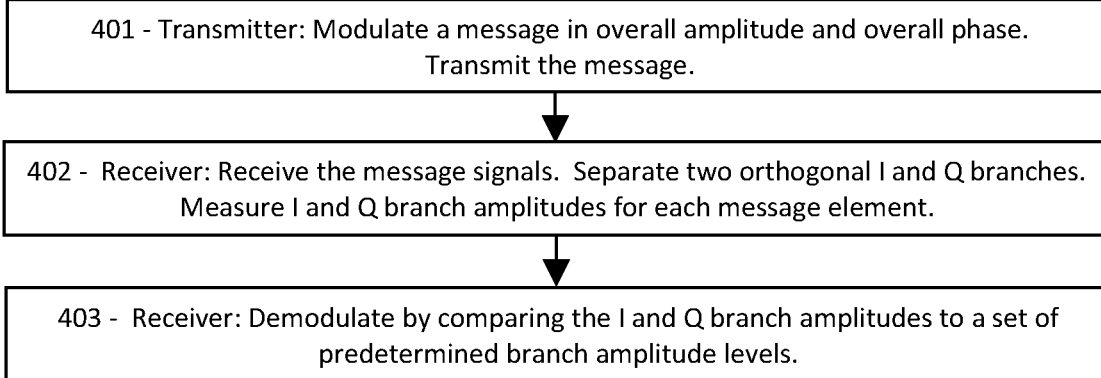
FIG. 4 is an flowchart showing an exemplary embodiment of a method to transmit a message modulated according to wave amplitude and phase, and then receive the message using quadrature components, according to some embodiments.

FIG. 4 is an flowchart showing an exemplary embodiment of a method to transmit a message modulated according to wave amplitude and phase, and then receive the message using quadrature components, according to some embodiments. As depicted in this non-limiting example, at 401 a transmitter modulates each message element of a message using multiplexed amplitude-phase modulation, and transmits the message as a series of sinusoidal waves, one sinusoidal wave per resource element, each sinusoidal wave having an overall amplitude and phase according to the message content. At 402, a receiver receives the wave as an incoming sinusoidal signal, but does not demodulate the incoming signal itself. Instead, the receiver separates the incoming wave into two orthogonal branches, the I-branch and the Q-branch. After some signal processing (frequency downconversion, filtering, limiting, digitization, subcarrier selection, etc.) the receiver measures the branch amplitudes of the I and Q branches. At 403, the receiver demodulates the message element by comparing the branch amplitudes to a calibration set containing predetermined branch amplitude levels of the modulation scheme (as determined from a demodulation reference, for example), and selecting the predetermined branch amplitudes closest to the measured I and Q branch amplitudes of the received message element.

Thus the transmitter modulates each message element according to a first modulation scheme involving multiplexed amplitude and phase modulation, and thereby provides a wide phase-noise margin equal to the separation between the modulated phase levels. The receiver then receives the transmitted wave and demodulates the message element according to a second modulation scheme involving orthogonal branch amplitudes. Receivers generally use orthogonal branch signals for signal processing and demodulation because this is an economical and effective way to do signal processing. The receiver thereby determines the message content while mitigating phase noise (due to the large phase level separations) and at low cost (by separately processing orthogonal components).

Figure 5A:
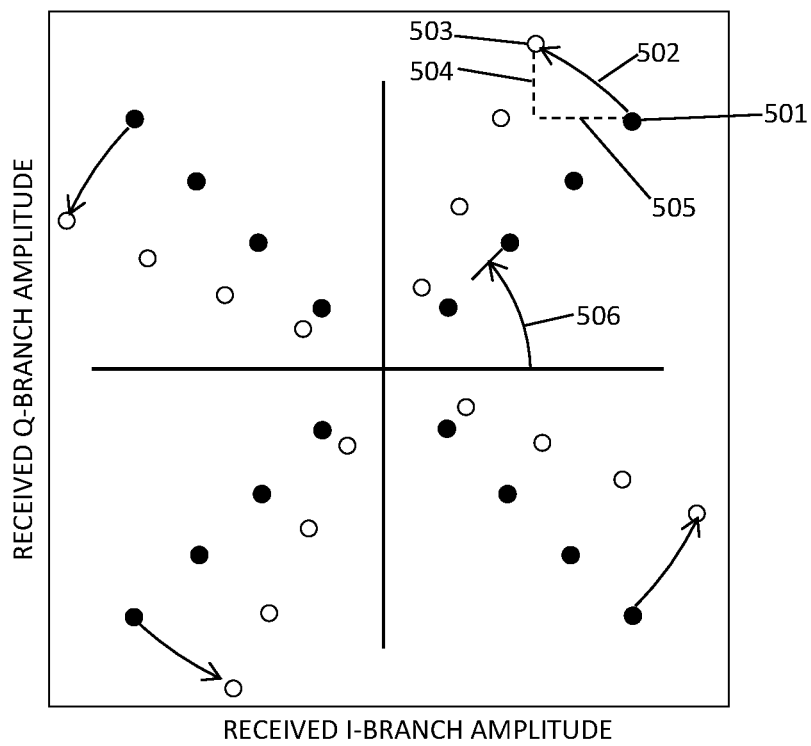
FIG. 5A is an exemplary embodiment of a constellation chart showing the received states of FIG. 2C including phase noise, according to some embodiments.

FIG. 5A is an exemplary embodiment of a constellation chart showing the received states of FIG. 2C, but now including phase noise, according to some embodiments. As depicted in this non-limiting example, a constellation chart such as 221 has been distorted by phase noise. In this case, and many cases of interest at high frequencies, the phase noise is due to clock errors and the like, which affect the phase of all modulation states in a similar way: rotating the phase of the state by a phase rotation angle which is proportional to the phase noise. Dots 501 indicate the undistorted modulation states as they would be received by a receiver if there were no phase noise, and little circles 503 indicate the same states rotated by phase noise.

The message is modulated in amplitude and phase of the overall waveform by the transmitter, and demodulated according to quadrature amplitude demodulation by the receiver. However, phase noise does not directly affect the I and Q branches; it directly rotates the overall phase of the incoming wave, and this results secondarily in changes to the I and Q amplitudes. As shown, the phase rotation angle 502 affects all of the modulation states in the same way, by rotating them to the distorted positions indicated by little circles 503.

The receiver can mitigate this phase noise by reversing the phase rotation (aside from high-order effects and receiver nonlinearities which are generally small and are ignored herein). First, the receiver can receive a demodulation reference proximate to the message, wherein the demodulation reference has a specific predetermined modulation which is known to the receiver. The receiver can determine the phase rotation angle by measuring the demodulation reference, and can then correct each of the I and Q branch amplitudes of the message elements by mathematically de-rotating them, specifically by calculating the I and Q amplitudes with the phase rotation reversed.

For example, regarding state 501, the receiver can calculate the distortion in the I-branch 505 according to the phase rotation angle 502 and the original phase angle 506 (here, 45 degrees), and can subtract that I-branch distortion 505 from the received I-branch amplitude. Likewise, the receiver can calculate the Q-branch distortion 504 and subtract it from the received Q-branch amplitude, thereby recovering the original, undistorted I and Q amplitudes of the original state 501. Geometrical formulas or algorithms can be used to calculate the I-branch and Q-branch distortions 505, 504 according to the received I-branch and Q-branch amplitudes and the phase rotation angle. Alternatively, formulas or algorithms can be used to calculate the corrected I-branch and Q-branch amplitudes directly. As a further alternative, the receiver can calculate the overall wave amplitude and phase corresponding to the received I and Q signals, subtract the phase rotation angle from the overall wave phase, and then calculate the corrected I-branch and Q-branch amplitudes accordingly. There are many other ways to implement the phase correction, all foreseen.

As an alternative mitigation strategy, the receiver can measure the angular deviation of each message element, on the I-Q plane, relative to the closest allowed state of the modulation scheme, and can average the angular deviations for a (preferably large) number of message elements, and thereby determine an estimate of the phase rotation angle. The receiver can then de-rotate those message elements by the estimated phase rotation angle as described. Preferably the message elements are all simultaneous, such as multiple subcarrier signals in an OFDM symbol, which generally have the same phase noise effects. Depending on the bandwidth of the phase noise, the same or similar phase rotation angle can be subtracted from other message elements in adjacent symbol-times. For example, if the phase noise does not vary substantially in one symbol-time, the receiver can calculate a running average of the estimated phase rotation angles versus symbol, and may thereby improve the accuracy of the phase noise mitigation.

Figure 5B:
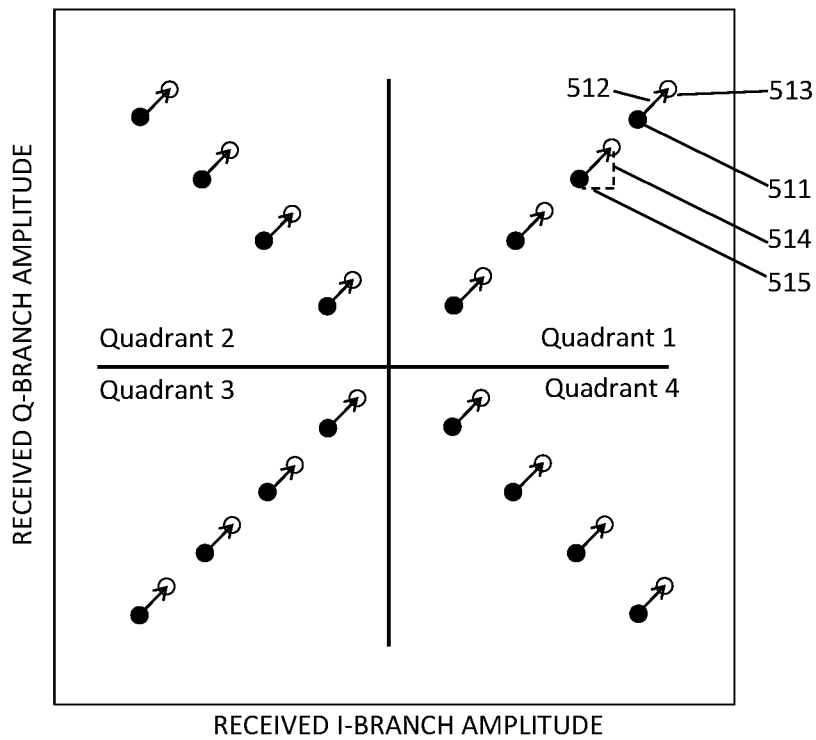
FIG. 5B is an exemplary embodiment of a constellation chart showing the received states of FIG. 2C including amplitude noise, according to some embodiments.

FIG. 5B is an exemplary embodiment of a constellation chart showing the received states of FIG. 2C including amplitude noise, according to some embodiments. As depicted in this non-limiting example, the I and Q branch amplitudes are distorted unidirectionally from the original position 511, to a distorted position 513. The amplitude noise causes an amplitude distortion by a distance 512. The amplitude noise is assumed to be at the same frequency as the message element but at a random phase. The amplitude noise may be due to interference at the same frequency, or it may be incoherent noise which has been extremely tightly filtered (by the subcarrier filter), thereby resulting in a narrow-band noise signal which is nearly equivalent to a synchronous interference signal. In either case, the primary distortion is wave interference. The wave interference includes both constructive and destructive interference regions, depending on the relative phase. In the depicted case, the noise or interference is constructive in Quadrant 1, destructive in Quadrant 3, and orthogonal (phase-shifting with minimal amplitude effect) in Quadrants 2 and 4. Hence, to sufficient accuracy, the amplitude noise effect can be regarded as an amplitude shift in a particular direction on the I-Q plane, for all of the modulation states (ignoring nonlinearities, as mentioned).

The receiver can negate the amplitude noise by first measuring the amplitude and phase of the noise as a "signal", calculating the magnitude and direction of an amplitude shift 512 caused by the noise, calculating the I-branch and Q-branch components 514, 515 of the amplitude shift, and subtracting those branch components 514, 515 from the as-received I and Q branch amplitudes. In this way, the receiver can determine corrected I and Q branch amplitudes, with the amplitude noise largely negated. Since the transmitted signal was modulated according to the amplitude and phase of the overall wave, the interference imposes the same amplitude shift on all of the modulation states in a constellation chart. Consequently, some of the modulation states are increased by the interference, some are decreased, and some are hardly affected. The receiver, by determining the amplitude and phase of the noise, can calculate those distortions and subtract them from the received I and Q amplitudes, and thereby recover the originally modulated message elements.

Figure 6:
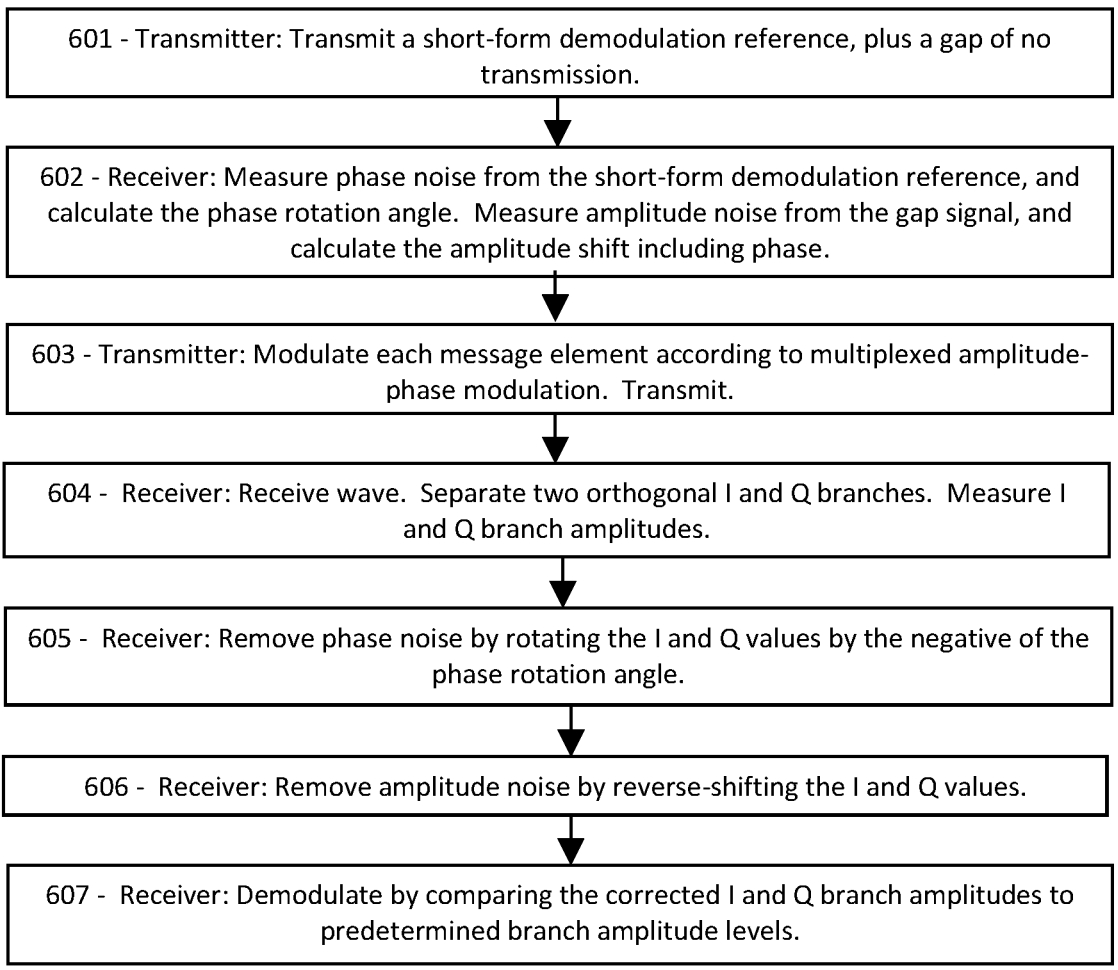
FIG. 6 is a flowchart showing an exemplary embodiment of a procedure for modulating a message according to overall wave amplitude and phase, receiving the message according to orthogonal branch amplitudes, and correcting amplitude noise and phase noise, according to some embodiments.

FIG. 6 is a flowchart showing an exemplary embodiment of a procedure for modulating a message according to the overall wave amplitude and phase, receiving the message according to orthogonal branch amplitudes, and correcting amplitude noise and phase noise, according to some embodiments. As depicted in this non-limiting example, at 601 a transmitter transmits a short-form demodulation reference that includes two resource elements, one exhibiting the maximum amplitude level of the first modulation scheme, and the other one a "gap" of no transmission. At 602, a receiver receives the demodulation reference and determines several things about the noise: (a) the receiver measures phase noise according to a phase rotation angle of the signal in the maximum-amplitude portion of the demodulation reference, (b) measures a noise level, including the noise amplitude and phase, according to a signal received during the no-transmission portion of the demodulation reference, and then (c) recalibrates the scale of the predetermined amplitude levels according to the root-sum-square of the two branch amplitudes of the maximum-amplitude portion (since the root-sum-square is unaffected by the phase rotation). For example, the receiver can measure a reference I-branch amplitude and a reference Q-branch amplitude from the signal in the first resource element of the demodulation reference, and can determine the phase rotation angle from a ratio of the reference I-branch amplitude and the reference Q-branch amplitude. The receiver can then determine the amplitude and phase of the incoming noise or interference by measuring the noise I-branch amplitude and the noise Q-branch amplitude, of the noise signal that arrives during the no-transmission message element of the demodulation reference, and thereby determine an amplitude shift and its components in the I and Q directions. Alternatively, the receiver can update the scale of the calibration set (of predetermined branch amplitude levels) according to the magnitude of the amplitude shift, specifically by calculating a square root of a sum of the reference I-branch amplitude squared plus the reference Q-branch amplitude squared. Other ways of calculating the amplitude and phase distortions based on the demodulation reference, and applying them to the received branch amplitudes, are possible and foreseen.

At 603, the transmitter modulates a message according to a first modulation scheme that includes amplitude and phase modulation of each message element. The transmitter modulates the overall transmitted wave according to a set of predetermined amplitude levels and phase levels.

At 604 the receiver receives the overall wave with its overall amplitude and phase modulation, but now distorted by amplitude noise and phase noise. The receiver then demodulates the message according to a second modulation scheme, different from the first modulation scheme. In this case, the receiver amplifies and filters the overall wave, then separates two orthogonal branch components, and measures their branch amplitudes. At 605, the receiver negates the phase noise by calculating a corrected I branch amplitude and a corrected Q branch amplitude, according to the phase rotation angle. At 606, the receiver negates the amplitude noise by calculating a further corrected I branch amplitude and a further corrected Q branch amplitude, according to the amplitude and phase of the received noise signal in the gap of no transmission.

At 607, the receiver finishes the demodulation of each message element by comparing the corrected branch amplitudes to the calibration set, of predetermined branch amplitude levels, of the second modulation scheme, and selecting the closest of the predetermined branch amplitude levels for each message element. The receiver can thus demodulate the message, while largely negating amplitude noise and phase noise. As a result, enhanced messaging reliability can be achieved, and high frequency communication bands can be opened, at zero or negligible cost.

In some embodiments, the signal processing steps may be reversed or changed from those discussed, and other signal processing steps may be added. It is immaterial how the receiver determines the branch amplitudes, so long as the measured branch amplitudes are related to the transmitted overall wave plus noise.

Figure 7A:
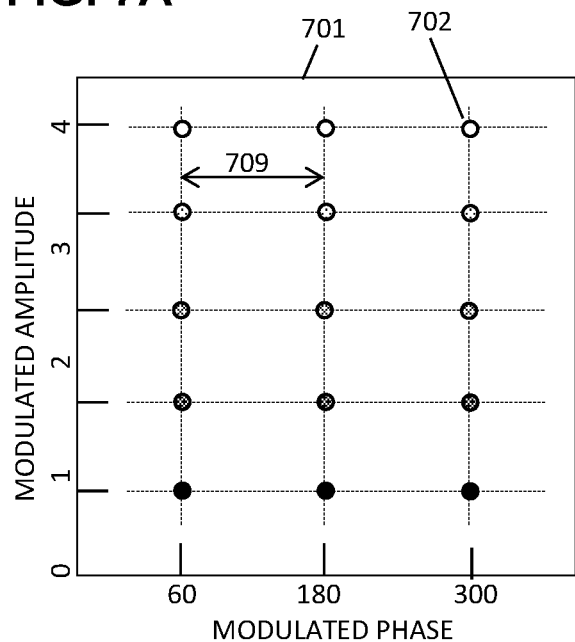
FIG. 7A is a modulation table showing an exemplary embodiment of states modulated according to a non-square modulation scheme with three phase levels, according to some embodiments.

FIG. 7A is a modulation table showing an exemplary embodiment of states modulated according to a non-square modulation scheme with three phase levels, according to some embodiments. As depicted in this non-limiting example, a modulation table 701 includes modulation states 702 in which the overall wave is modulated, by a transmitter, in amplitude and phase. The overall wave amplitude is modulated according to five equally spaced predetermined amplitude levels, and the overall wave phase is modulated according to three equally-spaced predetermined phases separated by 120 degrees as indicated 709. Hence, the modulation scheme is non-square because the number of phase levels is not equal to the number of amplitude levels. Icons are shaded from black for the lowest amplitude to white for the highest amplitude. The phase separation is 30 degrees larger than the phase separation of a square 16-state modulation scheme such as that of FIG. 2A, and this extra phase separation provides a wider phase noise margin, which may enable higher frequency communications. In addition, the added amplitude level enhances throughput. The 15 modulation states shown here almost matches the 16 states of, for example, 16QAM, and therefore the size of messages modulated according to the depicted scheme are only slightly longer than for 16QAM or the other 16-state modulation schemes. Due to the large phase noise margin of 120 degrees, communications are enabled in high-frequency bands that would be prohibited to 16QAM due to frequent phase faults.

Figure 7B:
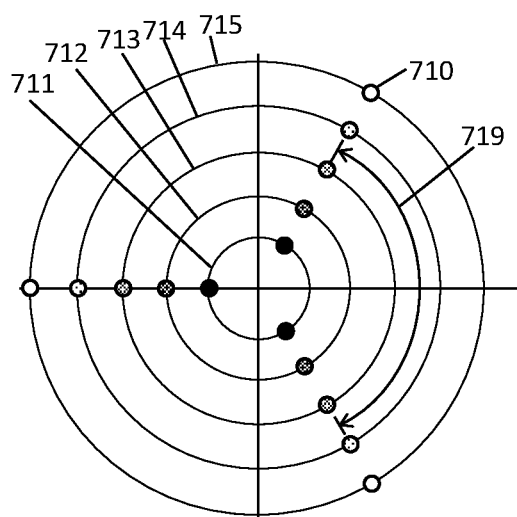
FIG. 7B is a polar plot showing an exemplary embodiment of states modulated according to a non-square modulation scheme with three phase levels, according to some embodiments.

FIG. 7B is a polar plot showing an exemplary embodiment of states modulated according to a non-square modulation scheme with three phase levels, according to some embodiments. As depicted in this non-limiting example, the states 710, corresponding to the states of the previous figure, are shown versus phase angle, with five circles 711, 712, 713, 714, 715 indicating the amplitude levels. As indicated by an arc-arrow 719, the spacing between phase levels is 120 degrees. The icons here are shaded in the same way as in FIG. 7A. This three-phase modulation scheme may be advantageous if prior-art modulation schemes result in excessive rates of phase faulting, and the extra amplitude level may be acceptable if there is little amplitude faulting.

Figure 7C:
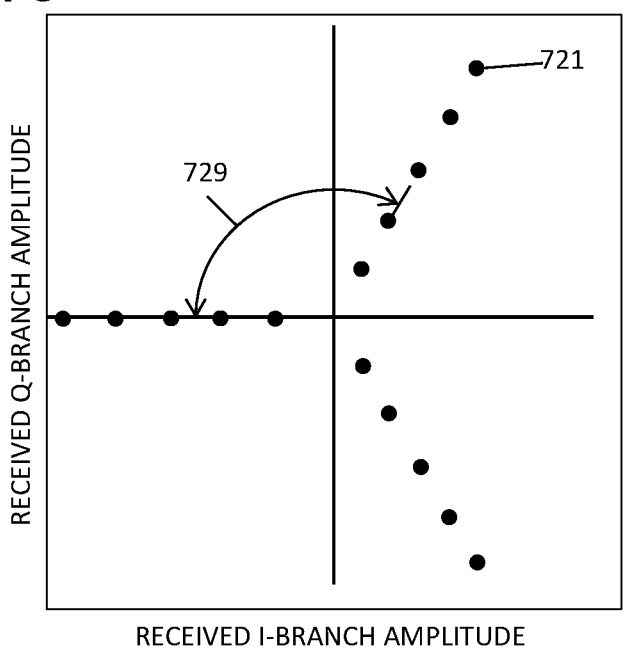
FIG. 7C is a constellation chart showing an exemplary embodiment of states modulated according to a non-square modulation scheme with three phase levels, and demodulated according to orthogonal branch amplitudes, according to some embodiments.

FIG. 7C is a constellation chart showing an exemplary embodiment of states modulated according to a non-square modulation scheme with three phase levels and five amplitude levels, and then demodulated according to two orthogonal amplitude-modulated branch signals, according to some embodiments. As depicted in this non-limiting example, the depicted modulation scheme may be invoked if a receiver has encountered excessive phase faults when using a modulation scheme that provides only 90-degree phase-noise margin. For wider phase noise tolerance, the transmitter has switched to the modulation scheme of FIG. 7A or 7B, in which the overall waveform states 721 are phase-modulated according to three predetermined phase levels separated by 120 degrees, as shown by the angle 729. The larger phase separation between the phase levels thereby enables the receiver to avoid most phase noise faults. In addition, the number of amplitude levels in the amplitude modulation of the overall wave was increased from four to five, to maintain sufficient throughput. As mentioned, the number of states is now 3×5=15 states, only slightly less than the 16 states of the previous modulation scheme. The asymmetric modulation scheme therefore provides almost the same information content per message element as the 16-state square modulation schemes.

In most cases, the lowest fault rate can be obtained by adjusting the modulation scheme so that the rates of phase faults and amplitude faults are approximately equal. When the rate of amplitude faults is much lower than the rate of phase faults, the additional amplitude level may provide needed throughput without causing excessive faulting.

Before switching to the 120-degree modulation scheme, the transmitter may inform the receiver of the change, so that the receiver can begin using the correct calibration set associated with the new modulation scheme. In this case, the receiver changes its tables of predetermined branch amplitude levels to those corresponding to the constellation chart depicted. Switching between the modulation scheme of FIG. 2A to the one depicted here can be straightforward, because the signal processing and I-Q branch extraction and branch amplitude determination steps remain unchanged in the modulation switch. Only the finishing demodulation step, such as step 607 of the flowchart above, is affected by the changed modulation scheme, and that is merely changing to a different set of predetermined branch amplitude levels. However, the branch amplitude levels in the depicted case would be different for the states of different overall phase, since those at phase 180 degrees have larger I-branch amplitude separations than states in the other two phase groups. The receiver can readily accommodate those changes by including, in the calibration set, an indication of which predetermined branch amplitude levels to use for which overall phases.

Figure 8A:
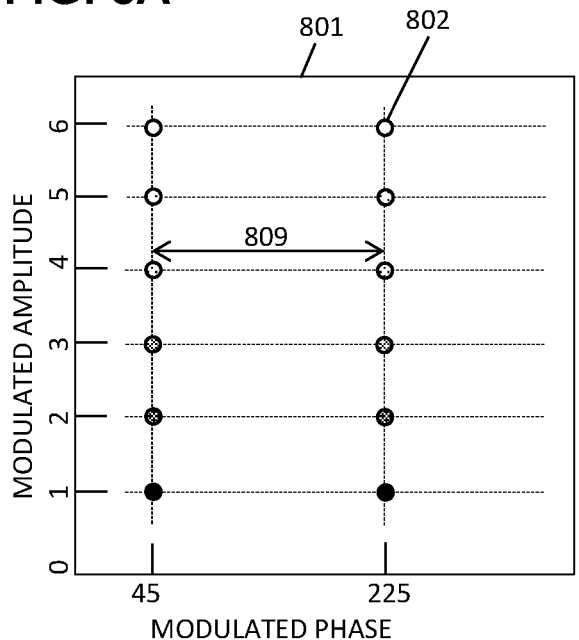
FIG. 8A is a modulation table showing an exemplary embodiment of states modulated according to a non-square modulation scheme with two phase levels, according to some embodiments.

FIG. 8A is a modulation table showing an exemplary embodiment of states modulated according to a non-square modulation scheme with two phase levels, according to some embodiments. As depicted in this non-limiting example, the asymmetric non-square modulation table 801 includes states 802 that are amplitude modulated, by a transmitter, according to six predetermined amplitude levels, and phase modulated by two predetermined phase levels as shown. Since Nphase is not equal to Namp, the table is non-square. The shading again goes from black at the lowest amplitude up to white for the highest amplitude. This two-phase modulation scheme provides a full 180 degrees of phase noise margin 809, which may be preferred at the highest frequencies where the phase noise is expected to be a seriously limiting factor.

Figure 8B:
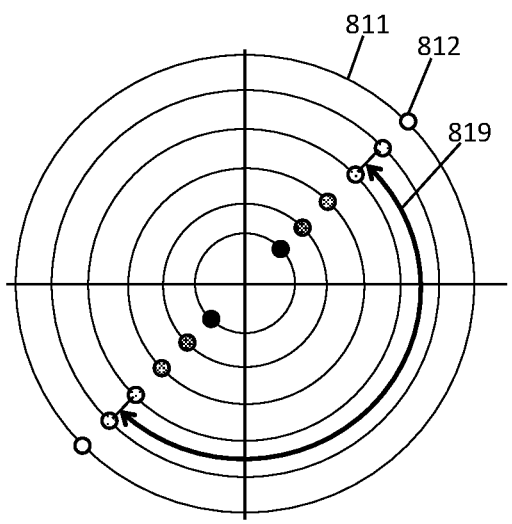
FIG. 8B is a polar plot showing an exemplary embodiment of states modulated according to a non-square modulation scheme with two phase levels, according to some embodiments.

FIG. 8B is a polar plot showing an exemplary embodiment of states modulated according to a non-square modulation scheme with two phase levels, according to some embodiments. As depicted in this non-limiting example, the states 812 correspond to those of the previous figure, on six amplitude circles 811, and separated by a large phase separation 819.

Figure 8C:
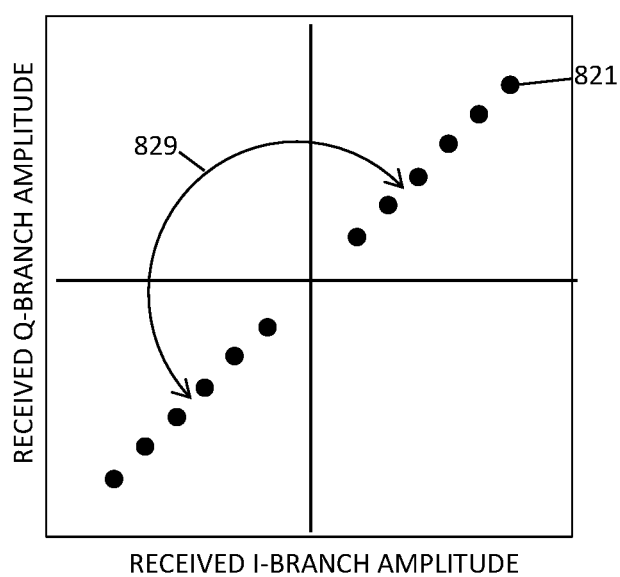
FIG. 8C is a constellation chart showing an exemplary embodiment of states modulated according to a non-square modulation scheme with two phase levels, and demodulated according to orthogonal branch amplitudes, according to some embodiments.

FIG. 8C is a constellation chart showing an exemplary embodiment of states modulated according to a non-square modulation scheme with two phase levels, and demodulated according to orthogonal branch amplitudes, according to some embodiments. As depicted in this non-limiting example, to combat excessive phase noise, the transmitter uses an especially phase-noise tolerant scheme in which the adjacent states 821 are separated by 180 degrees as shown 829. Such a scheme may be advantageous when the rate of amplitude faulting remains low, thereby allowing the number of amplitude levels to be increased to six amplitude levels. The number of states 821 is then 2×6=12 states. Messages are 33% longer than with the 16-state schemes on average, but with far more effective phase noise mitigation.

Due to the many options and variations disclosed herein, and other versions derived therefrom by artisans after reading this disclosure, it would be helpful for a wireless standards committee to establish conventions governing formats and implementation options for modulation according to overall wave amplitude and phase, while demodulating according to two orthogonal branch amplitudes, as disclosed. With such a beneficial modulation-demodulation scheme, future wireless users can enjoy phase-noise mitigation and amplitude-noise mitigation, transparently, with each communication.

The wireless embodiments of this disclosure may be aptly suited for cloud backup protection, according to some embodiments. Furthermore, the cloud backup can be provided cyber-security, such as blockchain, to lock or protect data, thereby preventing malevolent actors from making changes. The cyber-security may thereby avoid changes that, in some applications, could result in hazards including lethal hazards, such as in applications related to traffic safety, electric grid management, law enforcement, or national security.

In some embodiments, non-transitory computer-readable media may include instructions that, when executed by a computing environment, cause a method to be performed, the method according to the principles disclosed herein. In some embodiments, the instructions (such as software or firmware) may be upgradable or updatable, to provide additional capabilities and/or to fix errors and/or to remove security vulnerabilities, among many other reasons for updating software. In some embodiments, the updates may be provided monthly, quarterly, annually, every 2 or 3 or 4 years, or upon other interval, or at the convenience of the owner, for example. In some embodiments, the updates (especially updates providing added capabilities) may be provided on a fee basis. The intent of the updates may be to cause the updated software to perform better than previously, and to thereby provide additional user satisfaction.

The systems and methods may be fully implemented in any number of computing devices. Typically, instructions are laid out on computer readable media, generally non-transitory, and these instructions are sufficient to allow a processor in the computing device to implement the method of the invention. The computer readable medium may be a hard drive or solid state storage having instructions that, when run, or sooner, are loaded into random access memory. Inputs to the application, e.g., from the plurality of users or from any one user, may be by any number of appropriate computer input devices. For example, users may employ vehicular controls, as well as a keyboard, mouse, touchscreen, joystick, trackpad, other pointing device, or any other such computer input device to input data relevant to the calculations. Data may also be input by way of one or more sensors on the robot, an inserted memory chip, hard drive, flash drives, flash memory, optical media, magnetic media, or any other type of file-storing medium. The outputs may be delivered to a user by way of signals transmitted to robot steering and throttle controls, a video graphics card or integrated graphics chipset coupled to a display that maybe seen by a user. Given this teaching, any number of other tangible outputs will also be understood to be contemplated by the invention. For example, outputs may be stored on a memory chip, hard drive, flash drives, flash memory, optical media, magnetic media, or any other type of output. It should also be noted that the invention may be implemented on any number of different types of computing devices, e.g., embedded systems and processors, personal computers, laptop computers, notebook computers, net book computers, handheld computers, personal digital assistants, mobile phones, smart phones, tablet computers, and also on devices specifically designed for these purpose. In one implementation, a user of a smart phone or Wi-Fi-connected device downloads a copy of the application to their device from a server using a wireless Internet connection. An appropriate authentication procedure and secure transaction process may provide for payment to be made to the seller. The application may download over the mobile connection, or over the Wi-Fi or other wireless network connection. The application may then be run by the user. Such a networked system may provide a suitable computing environment for an implementation in which a plurality of users provide separate inputs to the system and method.

It is to be understood that the foregoing description is not a definition of the invention but is a description of one or more preferred exemplary embodiments of the invention. The invention is not limited to the particular embodiments(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater, or different steps than that shown here. All such other embodiments, changes, and modifications are intended to come within the scope of the appended claims.

As used in this specification and claims, the terms "for example", "e.g.", "for instance", "such as", and "like" and the terms "comprising", "having", "including", and their other verb forms, when used in conjunction with a listing of one or more components or other items, are each to be construed as open-ended, meaning that the listing is not to be considered as excluding other additional components or items. Other terms are to be construed using their broadest reasonable meaning unless they are used in a context that requires a different interpretation.

The invention claimed is:

1. A method for a wireless receiver to demodulate a message, the method comprising:
   a) receiving a demodulation reference modulated, by a transmitter, according to an amplitude-phase modulation scheme comprising Namp amplitude levels and Nphase phase levels;
   b) determining, according to the demodulation reference, the Namp amplitude levels and the Nphase phase levels of the amplitude-phase modulation scheme;
   c) receiving a message modulated, by the transmitter, according to the amplitude-phase modulation scheme, the message comprising message elements, each message element comprising a resource element of a resource grid, wherein each message element, as received by the wireless receiver, contains a received wave comprising a received wave amplitude and a received wave phase;
   d) for each message element, separating the received wave into an I-branch and an orthogonal Q-branch, the I-branch comprising an I-branch amplitude and the Q-branch comprising a Q-branch amplitude, the I-branch and Q-branch comprising a QAM (quadrature amplitude modulation) modulation scheme;
   e) for each message element, calculating the received wave amplitude according to a square root of a sum of the I-branch amplitude squared plus the Q-branch amplitude squared, and calculating the received wave phase according to an arctangent of a ratio of the Q-branch amplitude divided by the I-branch amplitude; and
   f) demodulating the message by selecting a particular amplitude level, of the Namp amplitude levels, closest to the received wave amplitude, and selecting a particular phase level, of the Nphase phase levels, closest to the received wave phase.

2. The method of claim 1, wherein the message is received according to 5G or 6G technology.

3. The method of claim 1, wherein the amplitude-phase modulation scheme comprises amplitude modulation multiplexed with phase modulation.

4. The method of claim 1, wherein the Namp amplitude levels are equally spaced apart in amplitude, and the Nphase phase modulation levels are equally spaced apart in phase.

5. The method of claim 1, wherein the Nphase phase modulation levels are equally spaced apart in phase, and wherein the Namp amplitude levels are spaced apart unequally according to a formula.

6. The method of claim 1, wherein Namp is different from Nphase.

7. The method of claim 1, wherein the QAM modulation scheme comprises Nstate modulation states, wherein Nstate equals Namp times Nphase.

8. The method of claim 1, wherein the separating the received wave into an I-branch and an orthogonal Q-branch comprises:

a) measuring the I-branch amplitude according to an in-phase component of the received wave; and
b) measuring the Q-branch amplitude according to a quadrature-phase component of the received wave.

9. The method of claim 1, wherein:
a) the demodulation reference comprises a first resource element and a second resource element;
b) the first resource element is modulated, by the transmitter, according to a maximum amplitude level of the Namp amplitude levels, multiplexed with a maximum phase level of the Nphase phase levels; and
c) the second resource element comprises zero transmission.

10. The method of claim 9, further comprising:
a) measuring a received phase angle according to a received demodulation signal in the first resource element of the demodulation reference; and
b) determining a phase rotation angle comprising a difference between the received phase angle and the maximum phase level of the Nphase phase levels.

11. The method of claim 10, further comprising:
a) before demodulating each message element, subtracting the phase rotation angle from from the received wave phase of the message element.

12. The method of claim 9, further comprising:
a) receiving a background signal in the second resource element of the demodulation reference; and
b) determining a background amplitude of the background signal and a background phase of the background signal.

13. The method of claim 12, further comprising:
a) for each message element, subtracting the background amplitude from the received wave amplitude when the background phase is aligned with the received wave phase, and adding the background amplitude to the received wave amplitude when the background phase is opposite to the received wave phase.

14. The method of claim 12, further comprising, before calculating the received wave amplitude and phase:
a) for each message element, calculating an I-branch amplitude correction according to the background amplitude and the background phase, and calculating a Q-branch amplitude correction according to the background amplitude and the background phase; and
b) subtracting the I-branch amplitude correction from the I-branch amplitude, and subtracting the Q-branch amplitude correction from the Q-branch amplitude.

15. A method for a transmitter of a base station of a wireless network to mitigate message faults, the method comprising:
a) using a modulation scheme comprising amplitude modulation multiplexed with phase modulation, the amplitude modulation according to integer Namp amplitude levels and the phase modulation according to integer Nphase phase modulation levels;
b) determining a rate of amplitude faults and a rate of phase faults, wherein an amplitude fault comprises a message modulated, by the transmitter, according to a particular amplitude level of the Namp amplitude levels, and then demodulated, by a receiver, according to a different amplitude level of the Namp amplitude levels, and wherein a phase fault comprises a message modulated, by the transmitter, according to a particular phase level of the Nphase phase levels, and then demodulated, by a receiver, according to a different phase level of the Nphase phase levels;
c) selecting a second modulation scheme comprising integer Mamp amplitude levels and integer Mphase phase levels, wherein Mamp and Mphase are selected according to the rate of amplitude faults and the rate of phase faults; and
d) wherein either Mamp is different from Namp, or Mphase is different from Nphase, or both.

16. The method of claim 15, wherein the selecting a second modulation scheme comprises:
a) when the rate of amplitude faults exceeds the rate of phase faults, selecting Mamp less than Namp; and
b) when the rate of phase faults exceeds the rate of amplitude faults, selecting Mphase less than Nphase.

17. The method of claim 15, wherein Namp is different from Nphase, or Mamp is different from Mphase, or both.

18. A method for a wireless transmitter to optimize communication throughput, the method comprising:
a) using a first modulation scheme comprising amplitude modulation multiplexed with phase modulation, the amplitude modulation according to integer Namp amplitude levels and the phase modulation according to a first plurality of phase levels, wherein the phase levels of the first plurality are uniformly spaced apart by a first phase separation;
b) determining a rate of phase faults, wherein a phase fault comprises a message transmitted, by the transmitter, according to a particular phase level of the first plurality, and demodulated, by a receiver, according to a different phase level of the first plurality than the particular phase level; and
c) when the rate of phase faults exceeds a predetermined threshold, changing to a second modulation scheme comprising a second plurality of phase levels uniformly spaced apart by a second phase separation, wherein the second phase separation is larger than the first phase separation.

19. The method of claim 18, further comprising:
a) when the rate of phase faults is less than a second predetermined threshold, changing to a third modulation scheme comprising a third plurality of phase levels uniformly spaced apart by a third phase separation, wherein the third phase separation is smaller than the first phase separation.

20. The method of claim 18, further comprising:
a) after changing to the second modulation scheme, determining a subsequent rate of phase faults;
b) when the subsequent rate of phase faults exceeds the first predetermined threshold, changing to a modulation scheme comprising amplitude modulation according to integer Mamp amplitude levels, and phase modulation according to a single phase modulation level.

\* \* \* \* \*